United States Patent
Kwon et al.

(10) Patent No.: US 11,452,192 B2
(45) Date of Patent: Sep. 20, 2022

(54) CENTRAL SERVER AND DRAMATIC PERFORMANCE SYSTEM INCLUDING SAME

(71) Applicant: HYBE CO., LTD., Seoul (KR)

(72) Inventors: Hyuntaek Kwon, Seoul (KR); Dongik Kim, Seoul (KR); Changon Lee, Seoul (KR); Sunho Cho, Seoul (KR)

(73) Assignee: HYBE CO., LTD, Seoul (KR)

( * ) Notice: Subject to any disclaimer, the term of this patent is extended or adjusted under 35 U.S.C. 154(b) by 0 days.

(21) Appl. No.: 16/771,910

(22) PCT Filed: Jun. 12, 2018

(86) PCT No.: PCT/KR2018/006633
§ 371 (c)(1),
(2) Date: Jun. 11, 2020

(87) PCT Pub. No.: WO2019/117409
PCT Pub. Date: Jun. 20, 2019

(65) Prior Publication Data
US 2021/0076471 A1 Mar. 11, 2021

Related U.S. Application Data

(60) Provisional application No. 62/597,437, filed on Dec. 12, 2017.

(30) Foreign Application Priority Data

Jan. 17, 2018 (KR) .................. 10-2018-0006304

(51) Int. Cl.
*H05B 47/165* (2020.01)
*H05B 47/19* (2020.01)
*H04L 67/125* (2022.01)

(52) U.S. Cl.
CPC ......... *H05B 47/165* (2020.01); *H04L 67/125* (2013.01); *H05B 47/19* (2020.01)

(58) Field of Classification Search
CPC .... H05B 47/165; H05B 47/19; H05B 47/155; H04L 67/125; G09G 2370/16;
(Continued)

(56) References Cited

U.S. PATENT DOCUMENTS

| 5,381,246 | A | 1/1995 | Suzuki et al. |
| 2014/0188527 | A1* | 7/2014 | Oxenham ............. G08B 5/221 705/5 |

(Continued)

FOREIGN PATENT DOCUMENTS

| JP | H06178096 A | 6/1994 |
| KR | 101446297 B1 | 10/2014 |

(Continued)

OTHER PUBLICATIONS

International Search Report issued in PCT/KR2018/006633 dated Aug. 24, 2018.

*Primary Examiner* — Daniel D Chang
(74) *Attorney, Agent, or Firm* — Capitol IP Law Group, PLLC

(57) ABSTRACT

A central server according to an embodiment of the present invention may comprise a database which stores library data corresponding to a library to be executed in a lighting device, a communication unit which transmits the library data to a mobile terminal of a user, and a processor which acquires a seat layout map of a performance hall and provides directing data including information on a color pattern that each of a plurality of pixels constituting the seat layout map has to express to each pixel.

7 Claims, 28 Drawing Sheets

(58) Field of Classification Search
CPC ....... G09G 2370/022; G09G 2300/026; G09G 3/2003; G09G 3/2074; G09G 5/02; G06F 3/1446; G06F 3/1423; G09F 2023/005; G09F 9/30; G08B 5/221
See application file for complete search history.

(56) References Cited

U.S. PATENT DOCUMENTS

2015/0012308 A1* 1/2015 Snyder ................ H05B 47/155
705/5
2015/0049908 A1 2/2015 Ogawa et al.

FOREIGN PATENT DOCUMENTS

| KR | 20170049088 A | 5/2017 |
| KR | 20170063273 A | 6/2017 |
| WO | 2013042206 A1 | 3/2013 |

* cited by examiner

1200

| Group identification information | Library identification information | StartTime | Pattern |
|---|---|---|---|
| ALL | 001 | 19:01 | RGB / ON_15 / OFF_15 / REPEAT_30 |
| GROUP1 | 002 | 19:50 | R / GRAD_10 / B / REPEAT_60 |
| GROUP2 | 002 | 19:50 | B / GRAD_10 / G / REPEAT_60 |
| GROUP3 | 002 | 19:50 | G / GRAD_10 / R / REPEAT_60 |
| GROUP1 | 003 | 20:35 | R / BLINK_30 / OFF |
| GROUP2 | 003 | 20:35 | OFF_30 / B / BLINK_30 / OFF |
| GROUP3 | 003 | 20:35 | OFF_60 / G / BLINK_30 / OFF |
| ALL | 004 | NULL | RGB / REPEAT_30 |
| GROUP1 | 005 | NULL | RGB / BLINK |
| GROUP2 | 005 | NULL | GRB / BLINK |
| GROUP3 | 005 | NULL | BRG / BLINK |

- 1210: first row
- 1220: GROUP1-3 / 002
- 1230: GROUP1-3 / 003
- 1240: ALL / 004
- 1250: GROUP1-3 / 005

FIG. 12

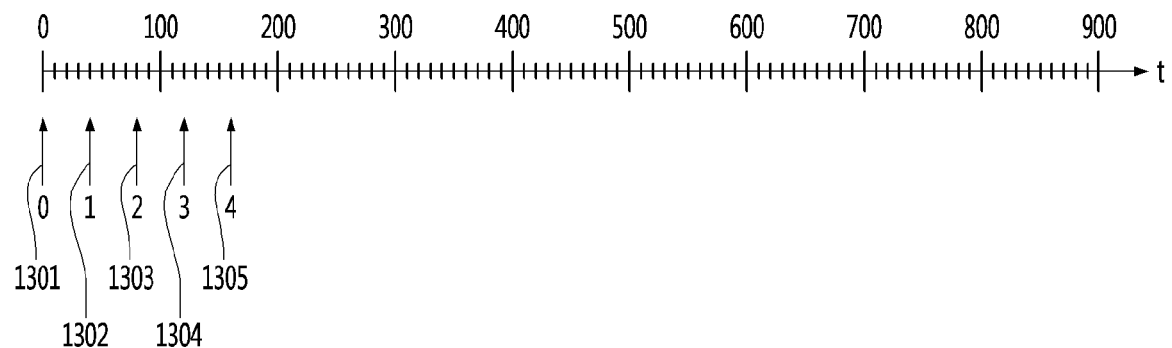

FIG. 13A

LED Off
BLE Off
Standalone mode Off

| Stand Alone | A | 58a |
| | B | 58b |
| | C | 58c |
| | D | 58d |

2200

Pixels in Video

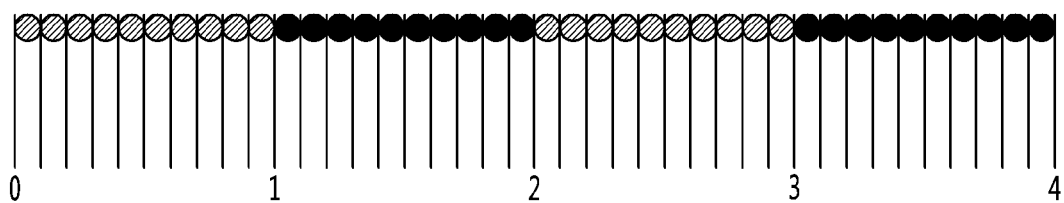
256 color conversion
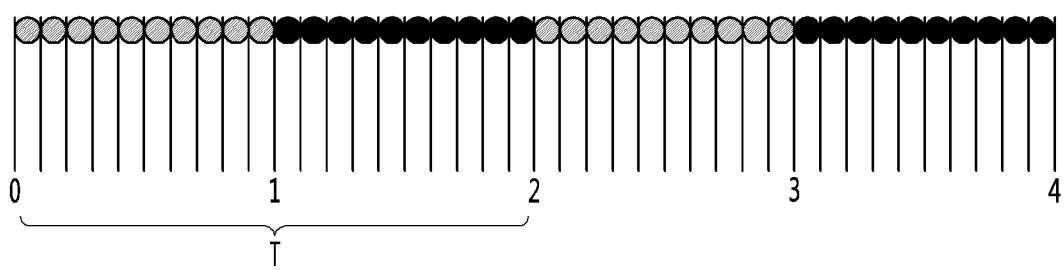
FIG. 27

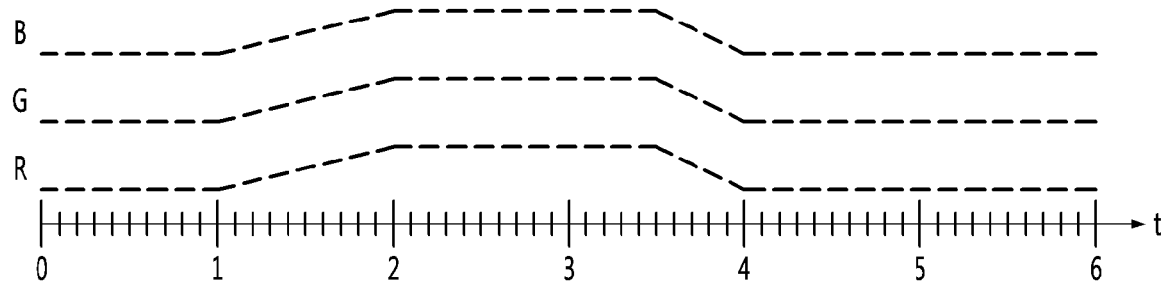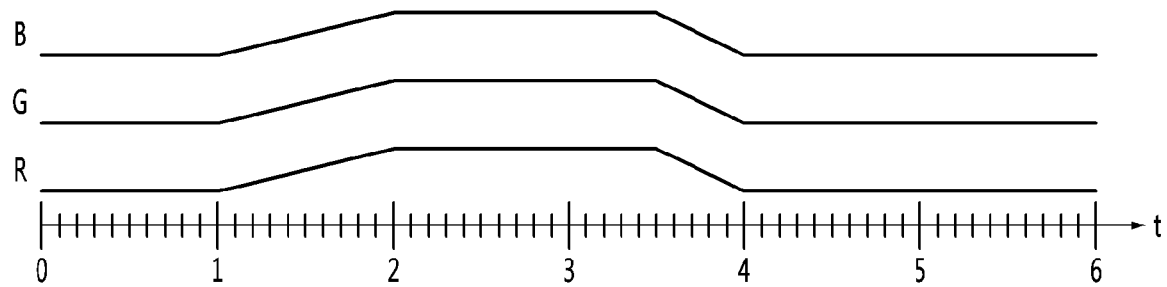
FIG. 29

CENTRAL SERVER AND DRAMATIC PERFORMANCE SYSTEM INCLUDING SAME

CROSS-REFERENCE TO RELATED APPLICATIONS

The present application is a U.S. National Phase of International Patent Application No. PCT/KR2018/006633, filed on Jun. 12, 2018, which claims the benefit and priority of U.S. Provisional Patent Application No. 62/597,437 filed Dec. 12, 2017 and Korean Patent Application No. 10-2018-0006304 filed on Jan. 17, 2018. The contents of the above applications are incorporated herein by reference in their entirety.

BACKGROUND OF THE INVENTION

1. Technical Field

The present disclosure relates to a central server and a performance system including the same.

2. Description of the Related Art

Lighting devices may be deployed in a performance hall, a music concert, or an art gallery where many people gather, in order to guide a performance, to instruct a movement in a space, or for aesthetic cheer.

In particular, a lighting device provided to each individual may operate in a different manner in accordance with a specific location in the space or the individual to which the lighting device is provided.

In a lighting device, information on light patterns to be output by the lighting device may be stored. The information on the light patterns may be generated by a central server in a performance system, and the generated information may be transferred to the lighting device through a user's mobile terminal.

In order for light patterns output by a plurality of lighting devices to look natural to an audience or a performer, it is important to proceed to extract colors output by the lighting devices and color patterns.

SUMMARY OF THE INVENTION

An aspect of the present disclosure is to provide a central server capable of effectively generating color patterns corresponding to light patterns output by a plurality of lighting devices.

Another aspect of the present disclosure is to reduce a capacity of data being transferred to respective lighting devices through extraction of only 256 colors during extraction of colors.

In accordance with an embodiment of the present disclosure, a central server includes: a database configured to store library data corresponding to a library to be executed by a lighting device; a communication unit configured to transmit the library data to a user's mobile terminal; and a processor configured to acquire a seat map of a performance hall and to give each of a plurality of pixels, constituting the seat map, direction data including information on a color pattern to be expressed by each of the plurality of pixels.

In accordance with an embodiment of the present disclosure, a performance system includes: a central server configured to generate a library; a control device configured to generate a control message indicating an execution command of the library; a transmission device configured to transmit the generated control message; a plurality of repeaters configured to transfer the control message, received from the transmission device, in a broadcasting method; and a plurality of lighting devices configured to store library data corresponding to the library and to execute the library using the stored library data in accordance with the control message received from the repeaters, wherein the central server is configured to acquire a seat map of a performance hall and to give each of a plurality of pixels, constituting the seat map, direction data including information on a color pattern to be expressed by each of the plurality of pixels.

According to the present disclosure, it is possible to generate color patterns corresponding to light patterns, output by a plurality of lighting devices, in a short time.

According to the present disclosure, because only 256 colors are extracted during color extraction, it is possible to reduce the capacity of data being transferred to the respective lighting devices and to increase the speed of data transmission.

BRIEF DESCRIPTION OF THE DRAWINGS

FIG. 12 is a diagram explaining information included in scenario data according to an embodiment of the present disclosure.

FIGS. 13A and 13B are diagrams explaining an example in which a lighting device controls the timing in accordance with repeated reception of a control message according to an embodiment of the present disclosure.

FIGS. 26 and 27 are diagrams explaining a process of extracting a color continuity of a pixel according to an embodiment of the present disclosure.

FIG. 29 is a graph illustrating changes in RGB values in case that a color pattern extracted according to an embodiment of the present disclosure is a breath pattern.

DETAILED DESCRIPTION

Hereinafter, embodiments related to the present disclosure will be described in more detail with reference to the accompanying drawings. In the following description, suffixes " . . . module" and " . . . unit" for constituent elements, as used herein, are given or are interchangeably used in consideration of only easiness in preparing the description, but do not have mutually distinctive meanings or roles.

In the description, a device, which is carried by or is provided to an individual, emits light in various patterns, and includes an auxiliary vibration function, is called a lighting device. The lighting device may be possessed by a user who watches a performance in a performance hall or a music concert, or may be fixed to a seat of each user to be provided to the user.

Next, a form in which a lighting device emits light, blinks, or additionally provides vibrations is called a pattern, and one or more patterns are combined with each other to present a scenario.

The scenario enables an image designed by a promoter to be expressed using light output by lighting devices.

For example, one scenario may correspond to a song. Accordingly, a playback time of one scenario may be equal to a playback time of a song.

The scenario may be composed of a plurality of libraries. Each of the plurality of libraries may correspond to a partial playback interval of the scenario.

Scenario data may include information necessary to execute the scenario.

The scenario data may include a plurality of pieces of library data.

Figure 1:
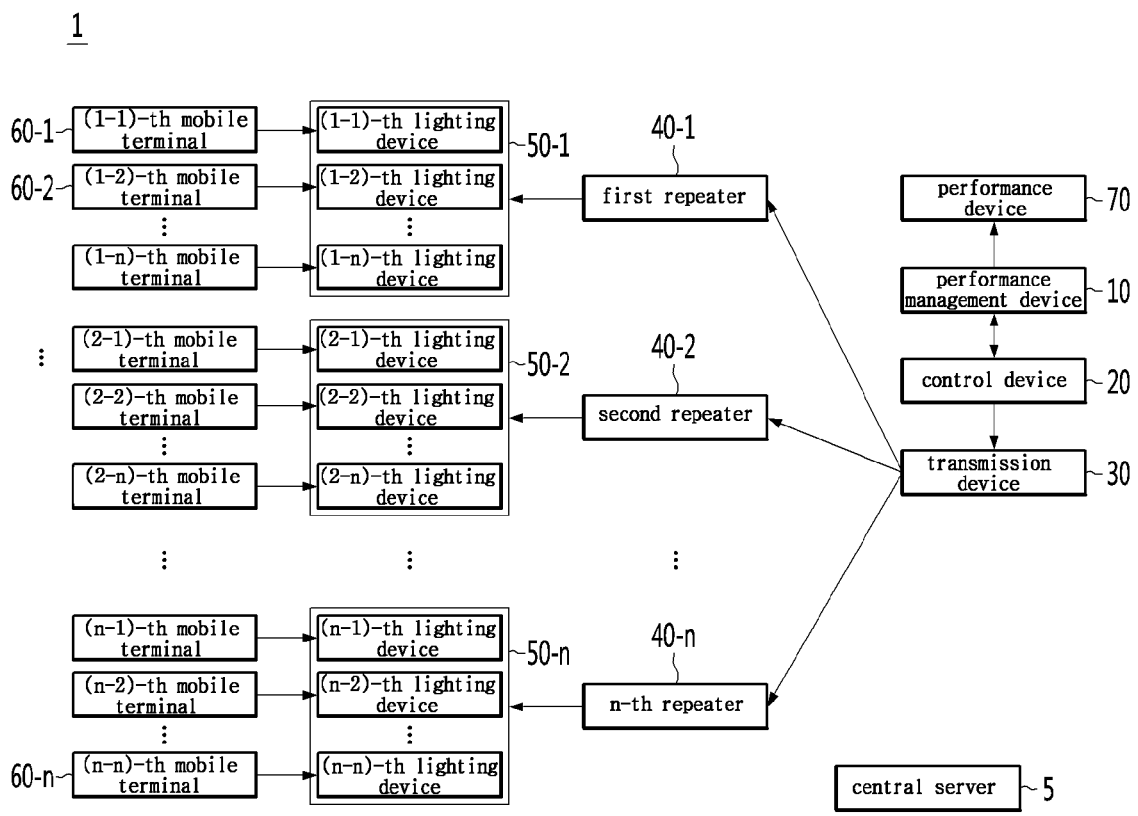
FIG. 1 is a block diagram explaining a performance system according to an embodiment of the present disclosure.
Figure 2:
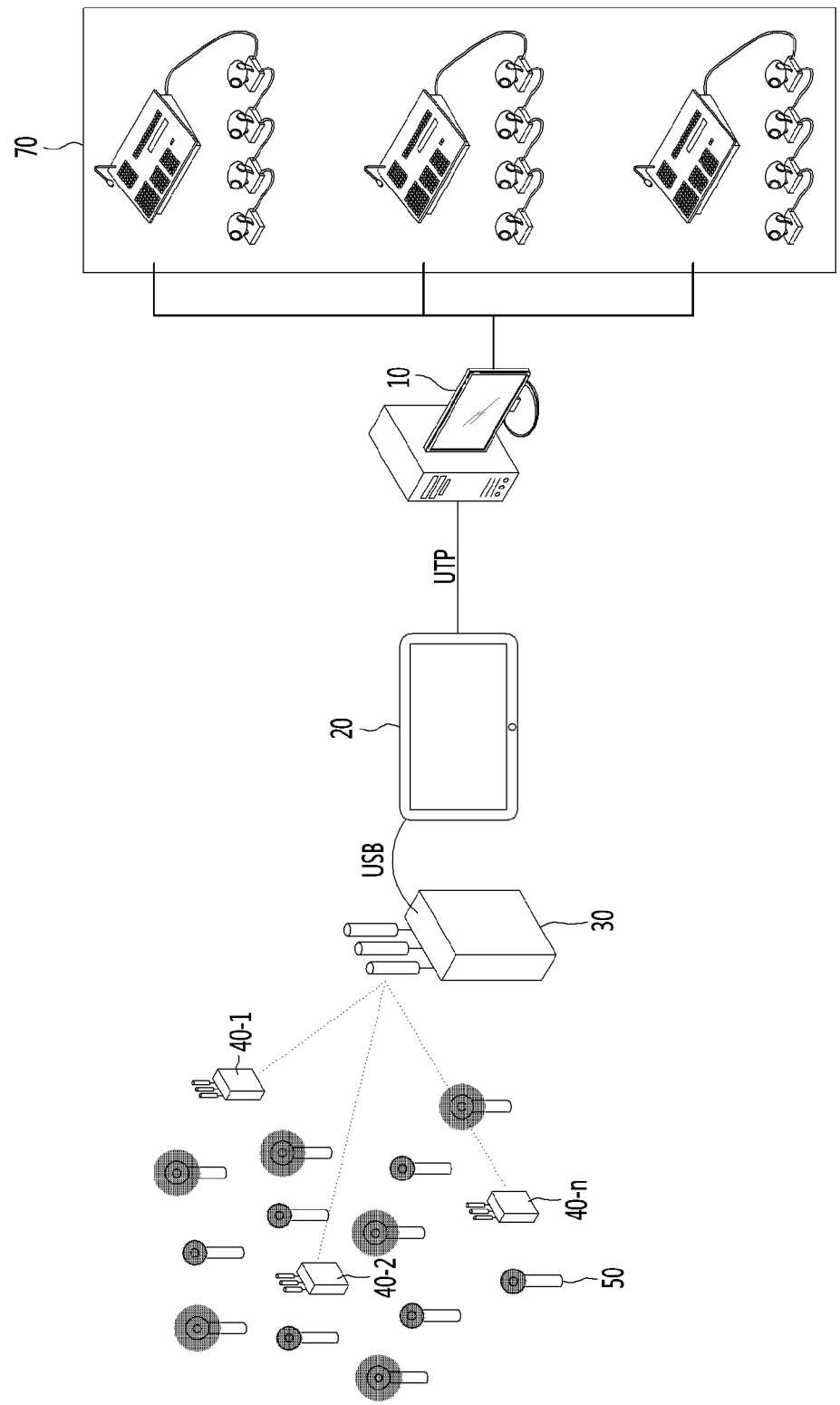
FIG. 2 is a diagram expressing in detail the configuration of the performance system according to an embodiment of the present disclosure.

FIG. 1 is a block diagram explaining a performance system according to an embodiment of the present disclosure, and FIG. 2 is a diagram expressing in detail the configuration of the performance system according to an embodiment of the present disclosure.

Referring to FIGS. 1 and 2, a performance system 1 according to an embodiment of the present disclosure may include a central server 5, a performance management device 10, a control device 20, a transmission device 30, a plurality of repeaters 40-1 to 40-n, a plurality of lighting groups 50-1 to 50-n, a plurality of mobile terminals 60-1 to 60-n, and a performance device 70.

The central server 5 may generate and store a scenario. The scenario may be designed by a performance promoter. The promoter may generate the scenario through a computing device which is included in the central server 5 or is composed separately from the central server 5.

Later, a mobile terminal 60 and the control device 20 may download scenario data corresponding to a scenario from the central server 5.

The performance management device 10 may be a device that manages operations of a sound device and an illumination device which constitute a stage.

The performance management device 10 may transfer timing signals for outputting sound and illumination, respectively, at a specific time to the sound device and the illumination device.

The control device 20 may receive a scenario from the central server 5, and may transmit, to the transmission device 30, a control message for operating a lighting device 50 in accordance with the received scenario.

The transmission device 30 may transmit the control message, transferred from the control device 20, to the plurality of repeaters 40-1 to 40-n.

Although the transmission device 30 has been explained as a separate configuration, this is merely an example, and the transmission device 30 may be included in the control device 20.

The plurality of repeaters 40-1 to 40-n may transmit the control message, transferred from the transmission device 30, to the plurality of lighting groups 50-1 to 50-n.

The reason why the plurality of repeaters 40-1 to 40-n are necessary is that the control message may not be properly transmitted to the respective lighting devices 50 in case that a performance hall is large-scaled.

Each of the plurality of repeaters 40-1 to 40-n may transmit the control message to the adjacent lighting groups in a broadcasting method. The broadcasting method may be a message transmission method in which receivers are not designated.

Each of the plurality of lighting groups 50-1 to 50-n may include a plurality of lighting devices.

Each of the plurality of mobile terminals 60-1 to 60-n may be paired to each of the plurality of lighting devices. A user may possess the mobile terminal and the lighting device 50.

The mobile terminal 60 may receive a scenario from the central server 5.

The performance device 70 may include the sound device for outputting sound, the illumination device for outputting illumination, and an image display device for outputting an image.

Operations between respective constituent elements constituting the performance system 1 will be described later.

Figure 3:
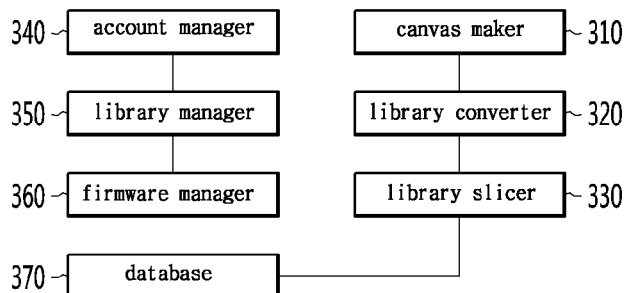
FIG. 3 is a block diagram explaining the configuration of a central server according to an embodiment of the present disclosure.

FIG. 3 is a block diagram explaining the configuration of a central server according to an embodiment of the present disclosure.

Referring to FIG. 3, the central server 5 may include a canvas maker 310, a library converter 320, a library slicer 330, an account manager 340, a library manager 350, a firmware manager 360, and a database 370.

The canvas maker 310 may generate a seat map of a performance. Further, the canvas maker 310 may map a ticket identifier to each of a plurality of seats constituting the seat map. The ticket identifier may be a seat number for identifying a seat.

Each of the plurality of seats may be called one pixel.

The library converter 320 may give colors to a plurality of pixels constituting the seat map using an image intended to be implemented from the lighting devices.

That is, in order to express a plurality of scenes constituting the image, colors corresponding to the scenes may be given to the plurality of pixels.

The library converter 320 may convert the image into a dot animation based on the colors given to the plurality of pixels.

The library slicer 330 may separate data for all directions being used for a performance time into the plurality of pixels based on the dot animation. The data for the directions may include information about the colors that should be expressed by the respective pixels and time for expressing the colors.

The account manager 340 may manage a plurality of accounts. Each of the plurality of accounts may correspond to an account of each of a plurality of promoters.

The library manager 350 may manage the operations of the canvas maker 310, the library converter 320, and the library slicer 330.

The library manager 350 may generate the plurality of libraries as one scenario.

The firmware manager 360 may manage software for directing the performance.

The database 370 may store a plurality of libraries and a plurality of scenarios.

The database 370 stores the plurality of scenarios corresponding to the plurality of accounts, respectively.

Figure 4:
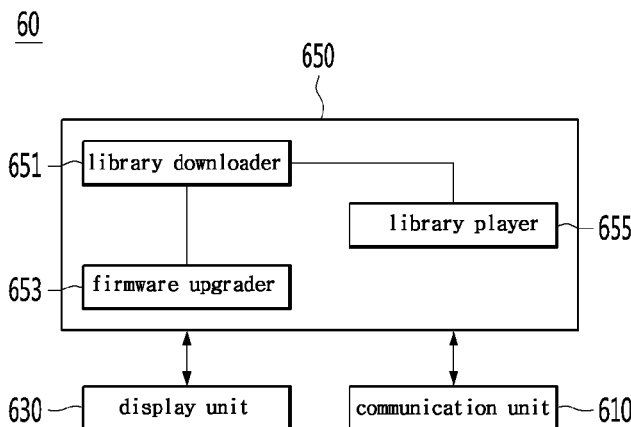
FIG. 4 is a block diagram explaining the configuration of a mobile terminal according to an embodiment of the present disclosure.

FIG. 4 is a block diagram explaining the configuration of a mobile terminal according to an embodiment of the present disclosure.

Referring to FIG. 4, the mobile terminal 60 according to an embodiment of the present disclosure may include a communication unit 610, a display device 630, and a controller 650.

The communication unit 610 may receive, from the central server 5, scenario data corresponding to a scenario and firmware for executing an application using the scenario data.

The communication unit 610 may transmit the scenario data and the firmware to the lighting device 50.

The communication unit 610 may transmit or receive information to or from at least one of a base station, an external terminal, and a server on a mobile communication network constructed in accordance with technical standards for mobile communication or communication schemes (e.g., global system for mobile communication (GSM), code division multi-access (CDMA), code division multi-access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), and long term evolution-advanced (LTE-A)).

The communication unit 610 may transmit or receive information to or from the lighting device 50 using radio frequency (RF) communication, such as Bluetooth, Bluetooth low energy (BLE), WiFi, ZigBee, or UWB.

The controller 650 may control the overall operation of the mobile terminal 60.

The controller 650 may include a library downloader 651, a firmware upgrader 653, and a library player 655.

The library downloader 651 may download the scenario data and library data from the central server 5 through the communication unit 610.

The firmware upgrader 653 may upgrade the existing firmware to a new version of firmware in case that the communication unit 610 receives the new version of firmware using the firmware received from the central server 5.

The library player 655 may play a scenario that the lighting device 50 being paired to the mobile terminal 60 should perform for a performance time.

Through this, a user may pre-identify the operation that should be performed by the user's own lighting device 50 during the performance time.

Figure 5:
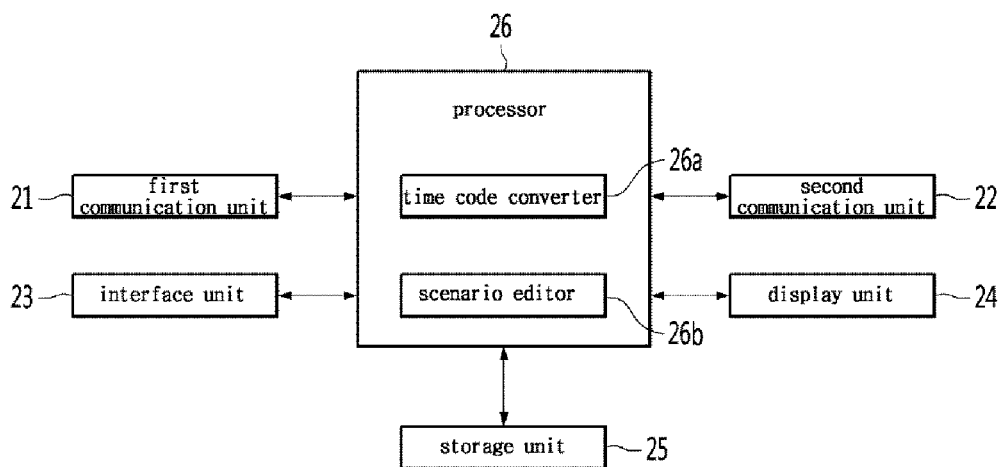
FIG. 5 is a block diagram explaining the configuration of a control device according to an embodiment of the present disclosure.

FIG. 5 is a block diagram explaining the configuration of a control device according to an embodiment of the present disclosure.

The control device 20 is a device that is possessed by a promoter or a manager who controls the operation of the lighting device 50 in a performance hall or a music concert, and may be a computer, a smart phone, or a tablet computer.

Referring to FIG. 5, the control device 20 may include a first communication unit 21, a second communication unit 22, an interface unit 23, a display unit 24, a storage unit 25, and a processor 26.

The first communication unit 21 may communicate with the transmission device 30. The first communication unit 21 may use the universal serial bus (USB) standard in order to perform communication with the transmission device 30.

The first communication unit 21 may transmit a control message to the transmission device 30. The control message may be a message for starting a library constituting a scenario.

As another example, the control message may be a message for stopping the currently operating library.

As still another example, the control message may be a message for executing a library having a pattern that is different from the pattern of the library stored in the lighting device 50.

The second communication unit 22 may perform communication with the central server 5 or the performance management device 10.

The second communication unit 22 may receive scenario data from the central server 5.

The interface unit 23 may receive a user input. The interface unit 23 may receive the user input for transmitting the control message to the transmission device 30.

The interface unit 23 may include a touch key and a push key.

The display unit 24 may output the stored scenario through simulating the same. A user may identify whether the lighting devices operate properly in accordance with the scenario through the simulation.

The storage unit 25 may store the scenario and the control message.

The processor 26 may control the overall operation of the control device 20.

The processor 26 may generate the control message, and may transmit the generated control message to the transmission device through the second communication unit 22.

The processor 26 may include a time code converter 26a and a scenario editor 26b.

The time code converter 26a may convert the control message into a time code. The time code may be a code for synchronizing the lighting groups 50-1 to 50-n.

The scenario editor 26b may generate and edit scenarios to be performed by the lighting devices in accordance with a user input.

Figure 6:
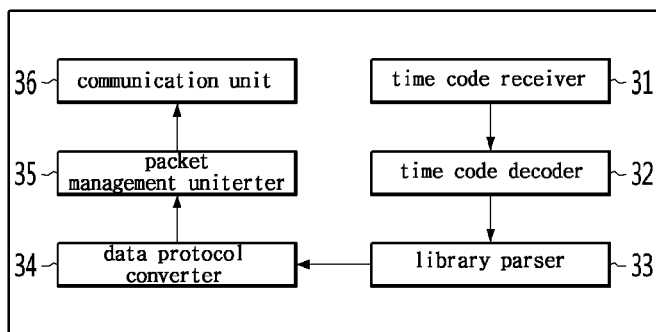
FIG. 6 is a block diagram explaining the configuration of a transmission device according to an embodiment of the present disclosure.

FIG. 6 is a block diagram explaining the configuration of a transmission device according to an embodiment of the present disclosure.

The transmission device 30 may include a time code receiver 31, a time code decoder 32, a library parser 33, a data protocol converter 34, a packet management unit 35, and a communication unit 36.

The time code receiver 31 may receive an analog type time code from the control device 20.

The time code decoder 32 may decode the analog type time code to digital type frame data. The frame data may include information on hour/minute/second.

The library parser 33 may acquire library identification information for identifying a library, which should be currently performed, by parsing the decoded time code.

The data protocol converter 34 may convert a communication protocol to transmit the acquired library identification information, and may transfer the converted packet to the packet management unit 35.

The packet management unit 35 may transfer the received packet to the communication unit 36.

The packet management unit 35 may generate a plurality of control messages. Each of the plurality of control messages may include the same library identification information.

Sequence numbers may be given to each of the plurality of control messages so that the control messages are transmitted at predetermined intervals.

The plurality of control messages may indicate execution commands for libraries being transmitted to the lighting devices 50.

The plurality of control messages may be named retransmission packets.

Transmission of the retransmission packets will be described with reference to FIGS. 13A and 13B.

The packet management unit 35 may minimize a loss of the control message, and may generate a synchronization packet to adjust the timing that may be distorted.

The synchronization packet may be a packet to identify whether the lighting device 50 well follows the execution of the library and to match an execution synchronization of the library.

The synchronization packet may be periodically generated until the execution of the library is ended after the transmission of the retransmission packet.

The communication unit 36 may transmit the packets, transferred from the packet management unit 35, to the plurality of repeaters 40-1 to 40-n, using the RF communication.

Figure 7:
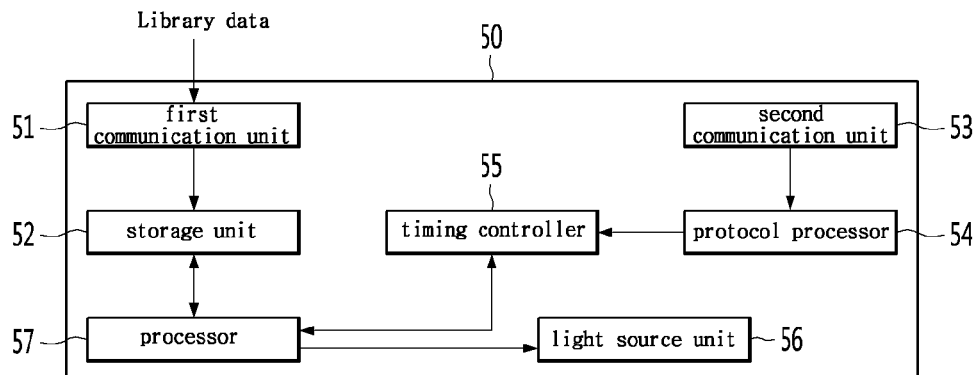
FIG. 7 is a diagram explaining the configuration of a lighting device according to an embodiment of the present disclosure.

FIG. 7 is a diagram explaining the configuration of a lighting device according to an embodiment of the present disclosure.

Referring to FIG. 7, the lighting device 50 may include a first communication unit 51, a storage unit 52, a second communication unit 53, a protocol processor 54, a timing controller 55, a light source unit 56, and a processor 57.

The first communication unit 51 may receive scenario data or library data from the mobile terminal 60.

The first communication unit 51 may include a BLE module or a wireless communication module using IEEE 802.15.4 standards. However, the first communication unit 51 is not necessarily limited thereto, but may receive the scenario data via wire.

The storage unit 52 may store the received scenario data or library data.

A user may pre-store the scenario data in the lighting device 50 at home, instead of a performance hall, or may store the scenario data in the lighting device 50 in a performance hall.

The second communication unit 53 may receive the control message from the transmission device 30.

The second communication unit 53 may transmit or receive information to or from the repeaters using radio frequency (RF) communication, such as Bluetooth, Bluetooth low energy (BLE), WiFi, ZigBee, or UWB.

The protocol processor 54 may discriminate the type of the message or the packet received by the second communication unit 53. If the received message is the control message, retransmission packet, or sync packet, the protocol processor 54 may transfer the same to the timing controller 55.

If the retransmission packet is received, the timing controller 55 may control the operation timing of the lighting device 50 based on respective sequences of the plurality of control messages included in the received retransmission packet.

If the sync packet is received, the timing controller 55 may control the operation timing of the lighting device 50 based on the received sync packet.

The sync packet may be called a synchronization packet. The details thereof will be described later.

In FIG. 7, although the timing controller 55 has been described as a separate configuration, this is merely an example, and the timing controller 55 may be included in the configuration of the processor 57.

The light source unit 56 may perform an operation of emitting light having a specific color, blinking, or controlling brightness, in accordance with the information stored in the storage unit 52 under the control of the processor 57.

The light source unit 56 may be composed of LEDs, but this is merely an example, and the light source unit 56 may also be composed of a specific light-emitting material.

The processor 57 may control the overall operation of the lighting device 50.

The processor 57 may control the operation of the light source unit 56 in accordance with the scenario data stored in the storage unit 52 and the control message received by the second communication unit 53.

The processor 57 may determine what scenario library is to be played based on the received control message.

That is, the processor 57 may determine which of the plurality of libraries constituting the scenario is to be executed, by parsing the control message.

The processor 57 may control the light source unit 56 to operate in accordance with the determined library.

In particular, based on library identification information included in the control message, the processor 57 may search for a pattern corresponding to the library identification information through the storage unit 52, and may control the light source unit 56 to output the corresponding pattern.

Figure 8:
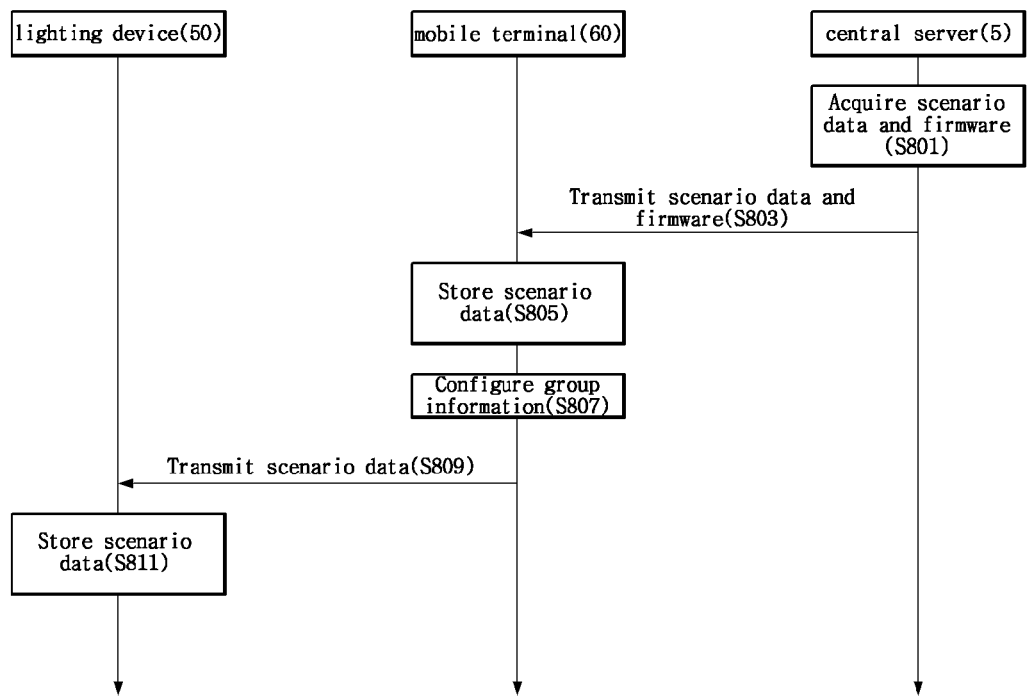
FIG. 8 is a ladder diagram explaining an operational relationship among a central server, a mobile terminal, and a lighting device according to an embodiment of the present disclosure.

FIG. 8 is a ladder diagram explaining an operational relationship among a central server, a mobile terminal, and a lighting device according to an embodiment of the present disclosure.

The central server 5 acquires scenario data and firmware capable of performing a scenario corresponding to the scenario data (S801), and transmits the acquired scenario data and the firmware to the mobile terminal 60 (S803).

The mobile terminal 60 stores the scenario data and the firmware received from the central server 5 (S805).

The mobile terminal 60 may install an application using the received firmware. The application may be used to transmit the scenario data to the lighting device 50.

The mobile terminal 60 configures group information of the scenario to be performed by the lighting device 50 (S807).

The group information may be information corresponding to a user's seat. The group information may be information for identifying the lighting group described above with reference to FIG. 1.

The group information may be configured by a user in a QR code tagging method through a ticket number or a ticket seat number using an application installed in the mobile terminal 60.

After configuring the group information, the mobile terminal 60 transmits the scenario data to the lighting device 50 (S809).

In an embodiment, the mobile terminal 60 may transmit the scenario data of all the lighting groups to the lighting device 50.

As another example, the mobile terminal 60 may transmit the scenario data corresponding to the configured group information.

The lighting device 50 stores the scenario data received from the mobile terminal 60 (S811).

The mobile terminal 60 may also transmit the firmware to the lighting device 50 in addition to the scenario data.

Accordingly, the lighting device 50 may be driven in accordance with the received firmware.

Figure 9:
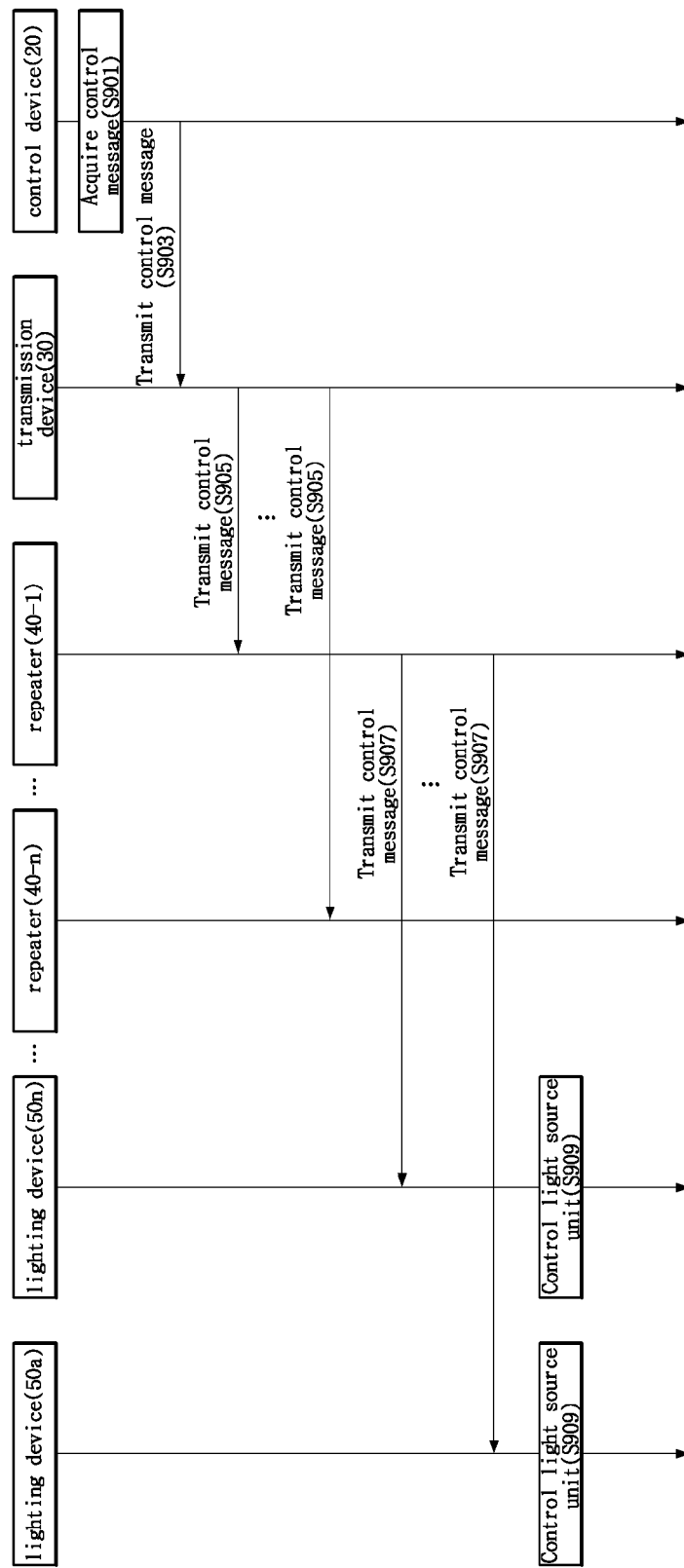
FIG. 9 is a ladder diagram explaining a process in which a control message used by lighting devices to execute a scenario is transmitted according to an embodiment of the present disclosure.

FIG. 9 is a ladder diagram explaining a process in which a control message used by lighting devices to execute a scenario is transmitted according to an embodiment of the present disclosure.

The control device 20 acquires a control message to be transmitted to the plurality of lighting devices 50-1 to 50-*n* (S901).

In an embodiment, the control message may be a message indicating a scenario execution command.

For example, if one scenario corresponds to a song sung by a singer, the control device 20 may generate the control message for executing the scenario to be performed for a playback time of the song.

The control device 20 transmits the acquired control message to the transmission device 30 (S903).

The transmission device 30 transmits the acquired control message to the plurality of repeaters 40-1 to 40-*n* (S905).

The plurality of repeaters 40-1 to 40-*n* transmit the control message, transmitted from the transmission device 30, to the plurality of lighting devices 50-1 to 50-*n*, respectively (S907).

In an embodiment, the plurality of repeaters 40-1 to 40-*n* may transmit the control message to the plurality of lighting devices 50-1 to 50-*n*, respectively, in a broadcasting method in which receivers are not designated.

The plurality of lighting devices 50-1 to 50-*n* control the operations of the light source units 56, respectively, in accordance with the received control message (S909).

Next, a scenario and data constituting the scenario according to an embodiment of the present disclosure will be described.

Figure 10:
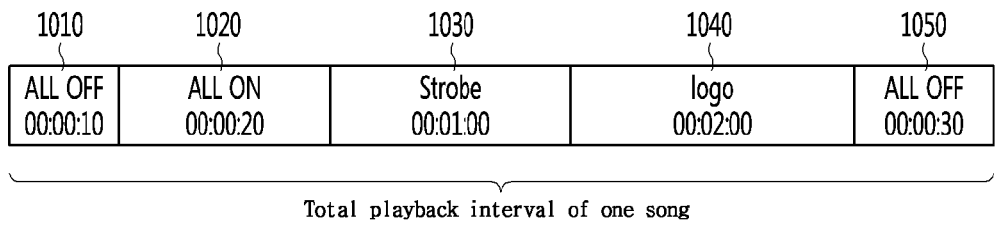
FIG. 10 is a diagram illustrating an example of a scenario according to an embodiment of the present disclosure.
Figure 11:
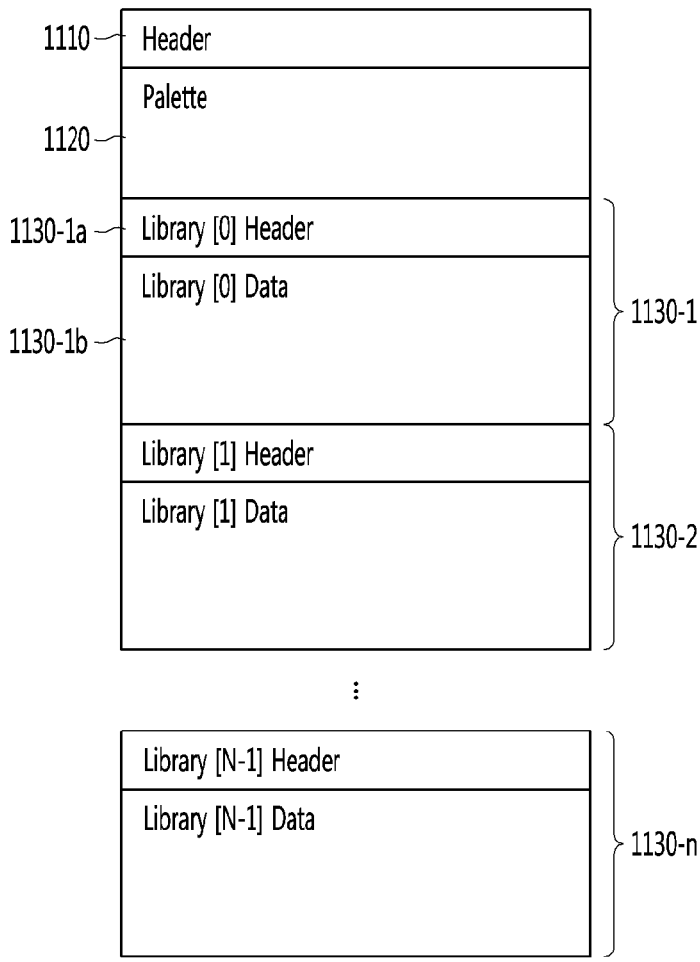
FIG. 11 is a diagram illustrating the actual configuration of scenario data according to an embodiment of the present disclosure.

FIG. 10 is a diagram illustrating an example of a scenario according to an embodiment of the present disclosure, and FIG. 11 is a diagram illustrating the actual configuration of scenario data according to an embodiment of the present disclosure.

FIG. 10 shows an example of a scenario 1000 corresponding to a playback interval of one song.

One scenario 1000 may include a plurality of libraries 1010, 1020, 1030, 1040 and 1050.

A scenario promoter may design the scenario by dividing the total playback interval of one song into a plurality of intervals through the control device 20 or the central server 5.

It is assumed that the total playback time of one song is four minutes.

The plurality of intervals may correspond to the plurality of libraries 1010, 1020, 1030, 1040 and 1050, respectively.

A first library 1010 may indicate that the light source units 56 of all the lighting devices should be turned off for 10 seconds from a start of a song.

A second library 1020 may indicate that the light source units 56 of all the lighting devices should be turned on for 20 seconds after performing the first library 1010.

A third library 1030 may indicate that the light source units 56 of all the lighting devices should perform strobe operations for one minute after performing the second library 1020.

A fourth library 1040 may indicate that the light source units 56 of all the lighting devices should output light to express a logo of a singer for two minutes after performing the third library 1030.

A fifth library 1050 may indicate that the light source units 56 of all the lighting devices should be turned off for 30 seconds after performing the fourth library 1040.

As described above, one scenario may be completed through combination of the first to fifth libraries 1010, 1020, 1030, 1040 and 1050.

The control message that the control device 20 transmits to all the lighting devices through the transmission device 30 and the plurality of repeaters 40-1 to 40-*n* may be the scenario execution command.

In another embodiment, the control message that the control device 20 transmits to all the lighting devices through the transmission device 30 and the plurality of repeaters 40-1 to 40-*n* may be a command for executing one library constituting a scenario.

Referring to FIG. 11, the structure of scenario data 1100 corresponding to the scenario 1000 is illustrated.

The scenario data 1100 may include a header 1110, a palette field 1120, and a plurality of library fields 1130-1 to 1130-*n*.

The palette field 1120 may include information on a color table capable of expressing 256 colors. The color table may include index values corresponding to the 256 colors, respectively. In this case, the color table may have a size of 1 byte.

The library data to be described later may include the index values included in the color table.

Each of the plurality of library fields 1130-1 to 1130-*n* may include a library header and a library data.

For example, a first library field 1130-1 may include a first library header 1130-1*a* and first library data 1130-1*b*.

The first library data 1130-1*b* may correspond to the first library 1010 of FIG. 10.

Each library data may include information on one or more of group identification information, library identification information, a lighting group operation start time, a lighting group operation end time, color information that should be output by the lighting group, and a pattern that should be output by the lighting group.

Information contained in each library data will be described in detail with reference to FIG. 12.

FIG. 12 is a diagram explaining information included in scenario data according to an embodiment of the present disclosure.

Referring to FIG. 12, scenario data 1200 may include a plurality of library data 1210 to 1250.

Group identification information is information for identifying that a plurality of lighting devices deployed in a space are divided into n groups, and the respective lighting groups perform different operations.

The group identification information may be used as information for identifying the lighting group described above with reference to FIG. 1.

If the group identification information is "ALL", it may indicate that all the lighting groups perform the same library.

The library identification information is information that is included in case that the control device 20 commands the respective lighting devices to operate in accordance with a specific library.

For example, if the control device 20 transmits a control message "library 002 operation", the lighting device executes "002" among the library identification information.

In case that the lighting devices are divided into the plurality of groups, the lighting device 50 may operate in accordance with the configured group number.

For example, in the same manner, if the lighting device 50 belonging to a first lighting group GROUP1 receives the command message "library 002 operation" from the control device 20, the lighting device 50 may perform a corresponding pattern "R/GRAD_10/B/Repeat 60".

Further, if the lighting device 50 belonging to a second lighting group GROUP2 receives the command message "library 002 operation" from the control device 20, the lighting device 50 may perform a corresponding pattern "B/GRAD_30/G/Repeat 60".

Further, if the lighting device 50 belonging to a third lighting group GROUPS receives the command message "library 002 operation" from the control device 20, the lighting device 50 may perform a corresponding pattern "G/GRAD_30/R/Repeat 60".

"StartTime" may indicate information corresponding to a time when the library is performed.

If the StartTime is "NULL", it means that the corresponding library operates in accordance with an indication of the control message of the control device 20.

The pattern may indicate a color of light emitted by the light source unit 56, a light emitting time, a repetition period, or a blinking or turn-off period. R, G, and B indicate red, green, and blue, respectively.

In case that the light source unit 56 can adjust light more precisely, the light source unit 56 may output colors obtained by combining the R, G, and B. In case of indication with RGB 256 colors, 1 byte (8 bits) may be defined for each of the R, G, and B, and in defining the RGB, 3 bytes may be required in displaying the RGB.

The color of light output by the light source unit 56 may be configured in various types, such as, RGB, R/G/B, or specific binary number, or hexadecimal number.

Further, the light source on/off and the holding time (second) may be recorded together. Further, the number of repetitions or repetition time may be configured as REPEAT.

"GRAD" means that light output by the light source unit 56 has a pattern that light is gradually changed in gradation. In an embodiment, the library "002" of the first lighting group is "R/GRAD_10/B/REPEAT_60", and this means that the color of the light output by the lighting device 50 is changed from red to blue in gradation for 10 seconds and such a change is repeated 60 times (or repeated for 60 seconds). "BLINK" indicates blinking.

Further, although not illustrated in FIG. 12, "Strobe" may indicate blinking at a higher speed than the speed of "Blink".

Figure 13B:
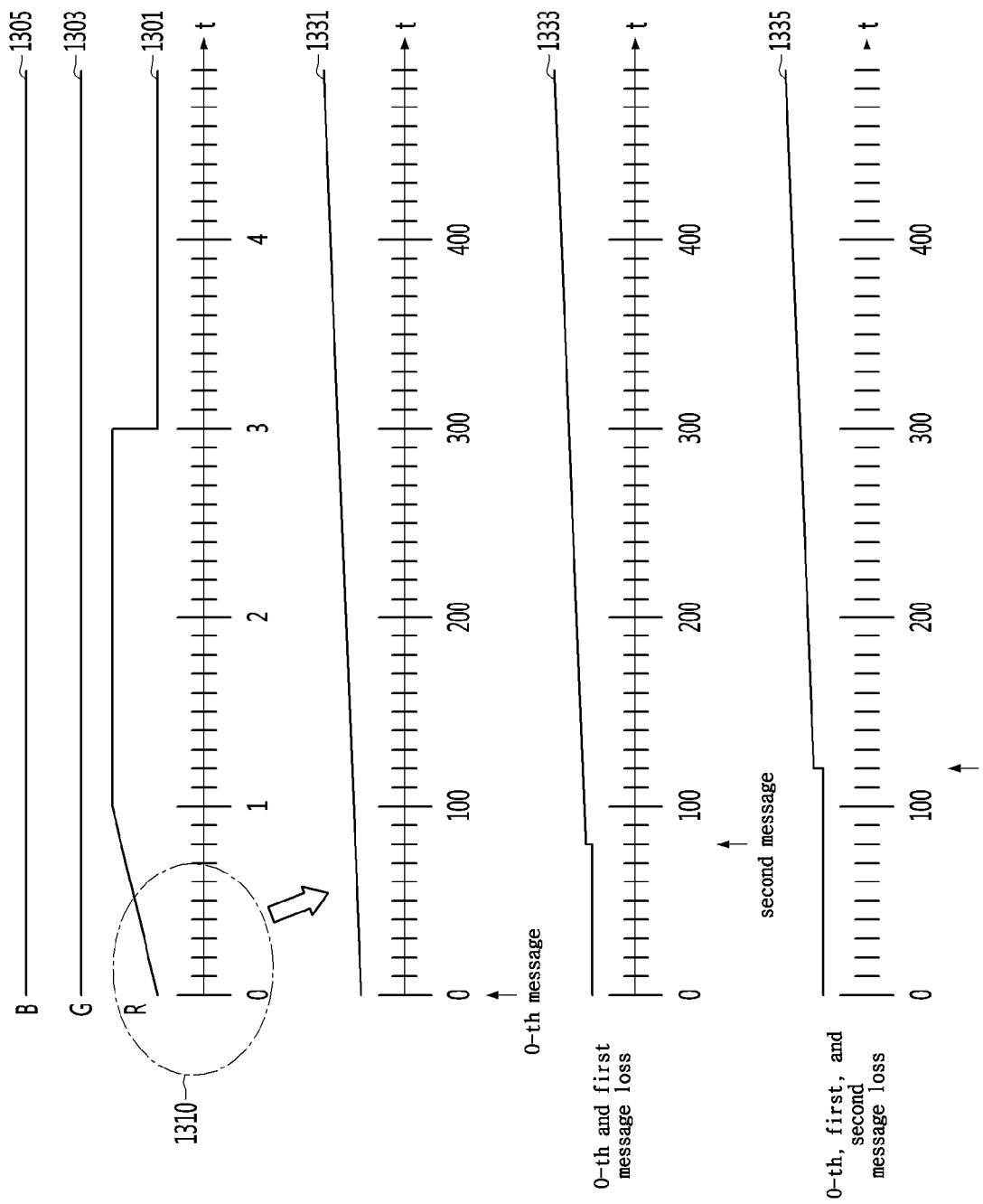

FIGS. 13A and 13B are diagrams explaining an example in which a lighting device controls the timing in accordance with repeated reception of a control message according to an embodiment of the present disclosure.

The control message may be transmitted to the lighting device 50 through a repeater 40 in a broadcasting method. In case of using a unicast method rather than the broadcasting method, the transmission device 30 needs to receive an ack message corresponding to the reception of the transmitted control message from the lighting device 50. In this case, if the ack message is received from a large number of lighting devices, a communication situation may deteriorate.

Accordingly, in an embodiment of the present disclosure, the transmission device 30 transmits the control message to the lighting device 50 in the broadcasting method.

Referring to FIG. 13, the transmission device 30 may repeatedly transmit the control message indicating an execution command of a specific library to the lighting device 50 five times.

The transmission device 30 may sequentially transmit 0-th to fourth control messages 1301 to 1305 to the lighting device 50.

The 0-th to fourth control messages 1301 to 1305 may be sequentially transmitted to the lighting device 50 in a predetermined period.

Each of the 0-th to fourth control messages 1301 to 1305 may include the same library identification information. However, the respective control messages may have different sequence numbers.

For example, when the 0-th to fourth control messages 1301 to 1305 are sequentially transmitted, the sequence number may be increased by 1.

The sequence number may indicate a transmission interval between the sequentially transmitted control messages. The transmission interval of the respective control messages may be 0.4 second, but this is merely an example.

The reason why the five control messages 1301 to 1305 are sequentially transmitted is to control even a fine timing difference among the respective lighting groups or the lighting devices in the lighting groups in a situation that the transmission of the control message may be omitted depending on the communication situation.

The omission of the transmission of the control message may indicate that the lighting device 50 is unable to receive the control message.

Referring to FIG. 13B, a pattern that should be performed by the lighting device 50 for an execution time of one library is illustrated in graph.

If it is assumed that the execution time of one library is 3 seconds, the lighting device 50 does not output blue and green (refer to 1303 and 1305), but outputs red gradually stronger for 1 second, and then maintains the output for the remaining 2 seconds (1301).

The initial 0.5 second period will be enlarged for explanation.

A first red pattern graph 1331 shows that the first lighting device gradually increases and outputs a red light in accordance with the 0-th control message 1301 in case that the first lighting device receives the 0-th control message 1301.

A second red pattern graph 1333 shows that the second lighting device gradually increases and outputs the red light in accordance with the second control message 1303 in case that the second lighting device is unable to receive the 0-th control message 1301 and the first control message 1302.

A third red pattern graph 1335 shows that the third lighting device gradually increases and outputs the red light in accordance with the third control message 1304 in case that the third lighting device is unable to receive the 0-th to second control messages 1301 to 1303.

The time when the five control messages 1301 to 1305 are sequentially transmitted is very short, and for this reason, even if some lighting devices are unable to receive the initial control message, the lighting devices may immediately perform the library through reception of the following control messages.

Further, the five control messages 1301 to 1305 may include sequence numbers indicating transmission intervals. The lighting device 50 having not received the initial some control messages may control the execution timing of the library using the sequence number included in the control message.

In accordance with the sequence number, the fine time difference between operations of the respective lighting devices 50 can be controlled.

Figure 14A:
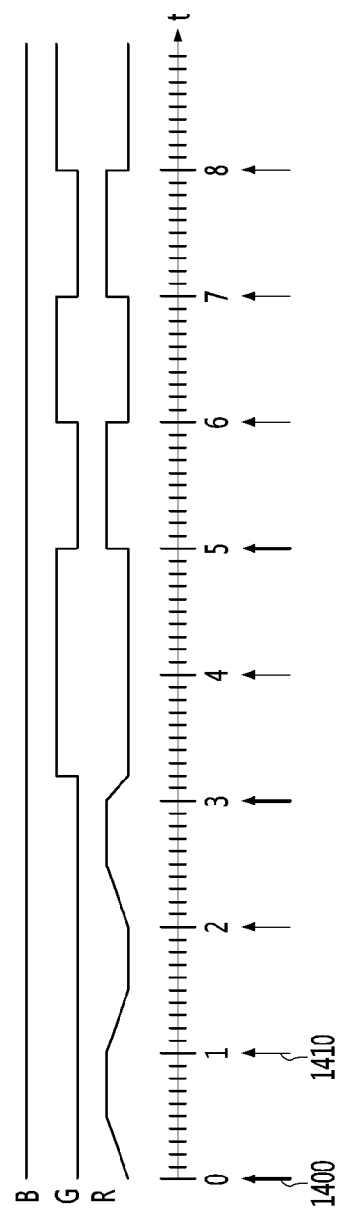
FIGS. 14A to 14C are diagrams explaining an example in which a lighting device controls the timing in accordance with repeated reception of a control message and reception of a sync packet according to an embodiment of the present disclosure.
Figure 14B:
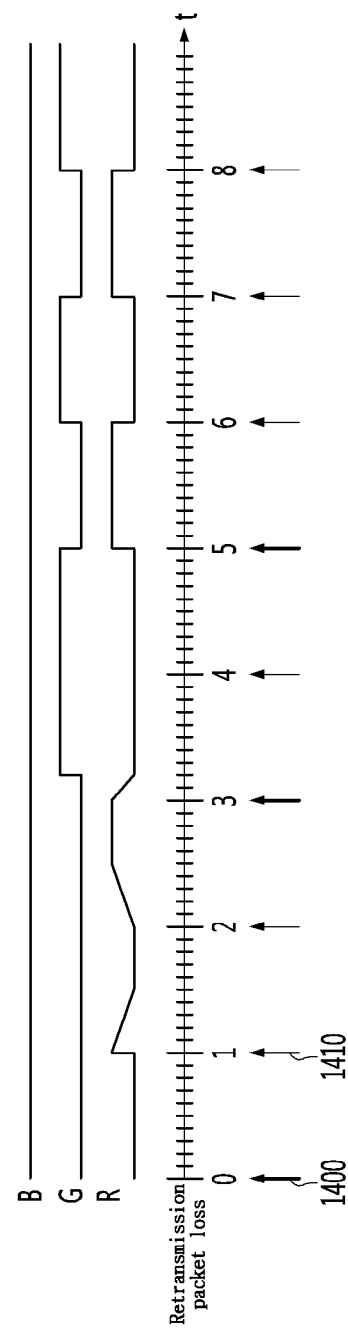
Figure 14C:
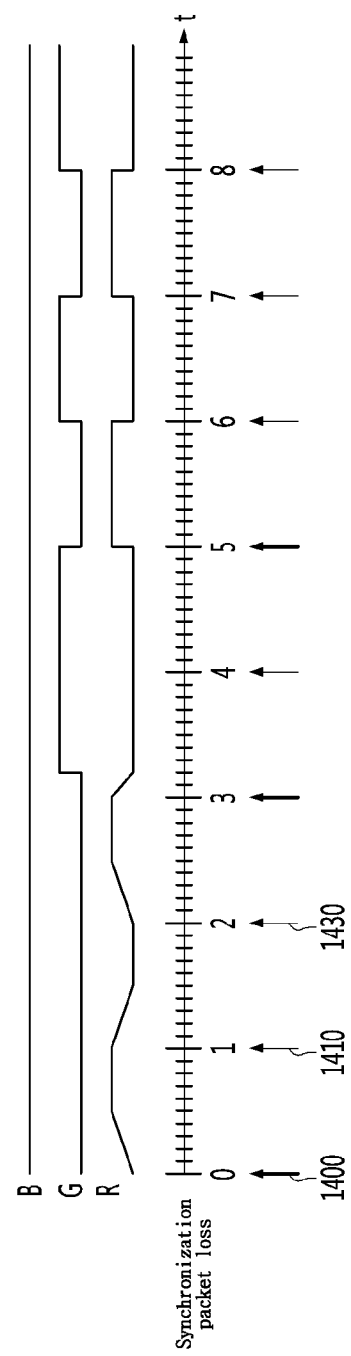

FIGS. 14A to 14C are diagrams explaining an example in which a lighting device controls the timing in accordance with repeated reception of a control message and reception of a sync packet according to an embodiment of the present disclosure.

In FIGS. 14A to 14C, it is assumed that the execution time of one library is 3 seconds.

Further, it is assumed that a bundle of the five control messages indicating the execution command of the library is a retransmission packet 1400. The five control messages have been described with reference to FIGS. 13A and 13B.

After transmitting the retransmission packet 1400, the transmission device 30 may transmit a sync packet 1410 to the respective lighting devices in each predetermined period. Further, the sync packet may be a packet for checking whether the respective lighting devices 50 well follow the execution of the library.

The sync packet may include information on one time point of a library and information on a pattern that should be performed at the corresponding one time point in order to match the operation synchronization among the respective lighting devices 50.

FIG. 14A shows a graph in which the first lighting device receives the retransmission packet 1400 and the sync packet 1410 and outputs a pattern corresponding to the library.

FIG. 14B shows a graph in which the second lighting device is unable to receive the retransmission packet 1400, but receives the first sync packet 1410, and outputs the pattern corresponding to the library from the time point when receiving the first sync packet 1410.

As illustrated in FIG. 14B, even in case that the second lighting device is unable to receive the retransmission packet 1400, the second lighting device may perform the library from the time point when receiving the first sync packet 1410 by means of the following first sync packet 1410.

FIG. 14C shows a graph in which the third lighting device receives the retransmission packet 1400 and the first sync packet 1410, but is unable to receive a second sync packet 1430, and outputs the corresponding pattern to the library.

As illustrated in FIG. 14C, even in case that the third lighting device is unable to receive the second sync packet 1430, the third lighting device may properly perform the library by means of the previously received retransmission packet 1400.

As described above, according to an embodiment of the present disclosure, even in case that the lighting device 50 is unable to receive the control message for executing the library, the lighting device 50 can immediately execute the library by means of the sync packet, and thus can effectively match the synchronization with other lighting devices.

Next, an operation mode of a lighting device will be described.

Figure 15:
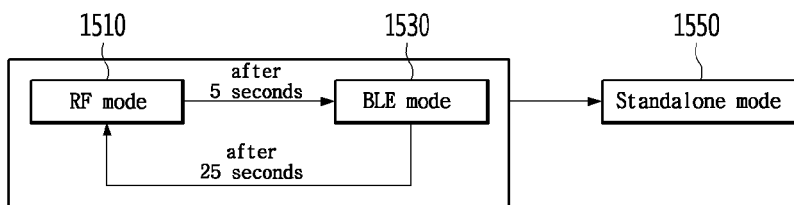
FIG. 15 is a diagram explaining an initialization operation when a lighting device is turned on according to an embodiment of the present disclosure.

FIG. 15 is a diagram explaining an initialization operation when a lighting device is turned on according to an embodiment of the present disclosure.

Hereinafter, it is assumed that operation modes of the lighting device 50 include an RF mode 1510, a BLE mode 1530, and a standalone mode 1550.

The RF mode 1510 may be a mode for performing communication with the repeater 40 using a communication protocol like ZigBee.

The BLE mode 1530 may be a mode for performing communication with the mobile terminal 60 using a low-power Bluetooth module.

The standalone mode 1550 may be a mode capable of turning on/off an output of the light source unit 56 without communication with an external device.

Referring to FIG. 15, if power of the lighting device 50 is turned on, the lighting device 50 operates in the RF mode 1510.

After 5 seconds, the operation mode of the lighting device 50 may be switched from the RF mode 1510 to the BLE mode 1530. Again, after 25 seconds, the operation mode of the lighting device 50 may be switched from the BLE mode 1530 to the RF mode 1510.

If the lighting device is unable to be BLE-connected with the mobile terminal 60 or receive a Heartbeat MSG message from the repeater while such a cycle is repeated n times, the operation mode of the lighting device 50 may be switched to the standalone mode 1550.

The reason why the operation mode of the lighting device 50 is changed in a power initialization process is to determine whether it is possible to take part in a performance by changing the operation mode because it is impossible to simultaneously use an RF protocol in case of using multiple RF stacks.

Next, FIG. 16 will be described.

Figure 16:
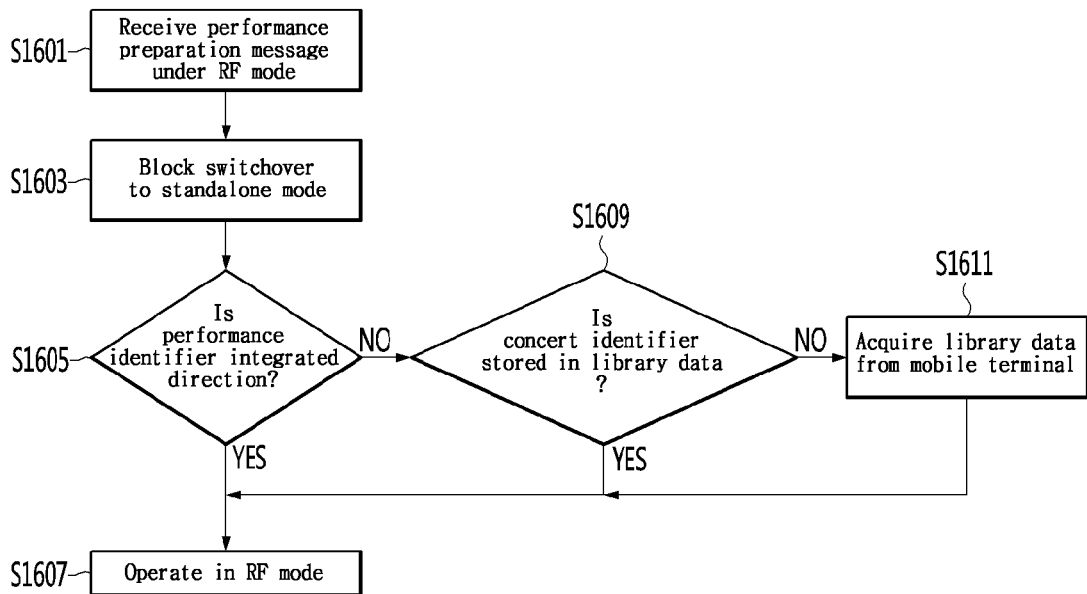
FIG. 16 is a flowchart explaining an operation process of a lighting device based on a direction type according to an embodiment of the present disclosure.

FIG. 16 is a flowchart explaining an operation process of a lighting device based on a direction type according to an embodiment of the present disclosure.

Referring to FIG. 16, the lighting device 50 receives a performance preparation message under the RF mode (S1601).

In an embodiment, the lighting device 50 may receive the performance preparation message from the repeater 40 through the control device 20.

The performance preparation message may be a message for blocking the switchover to the standalone mode. In case that a user enters a performance hall and performs an operation separately from the library by operating the lighting device 50 in the standalone mode, direction through the lighting devices may not be properly performed.

For this, the performance preparation message may be transmitted to the respective lighting devices 50 to prevent a user from arbitrarily controlling the lighting devices 50.

In accordance with the reception of the performance preparation message, the lighting device 50 blocks the switchover to the standalone mode (S1603).

In an embodiment, the lighting device 50 may be switched from the RF mode to the BLE mode in accordance with the reception of the performance preparation message. This is because a situation may occur, in which the lighting device 50 should receive the library data or the scenario data from the mobile terminal 60.

The lighting device 50 determines whether the performance type is an integrated direction based on a performance identifier included in the performance preparation message (S1605).

In an embodiment, if the performance type is the integrated direction, all the lighting devices may be collectively controlled under the control of the control device 20. In this case, it is not necessary for the lighting device 50 to store the library data. This is because the message transmitted by the control device 20 may include detailed operation contents (light output on or off) of the lighting device 50.

If the performance type is the integrated direction, the lighting device 50 operates in the RF mode (S1607).

Accordingly, the lighting device 50 prepares to receive the control message from the control device 20.

If the performance type is an individual direction, the lighting device 50 determines whether a concert identifier included in the performance preparation message is stored (S1609).

If the performance type is the individual direction, the lighting device 50 may search whether the concert identifier included in the performance preparation message is stored in the library data in the storage unit 52.

If the concert identifier included in the performance preparation message is stored, the lighting device 50 operates in the RF mode (S1607).

If the concert identifier is not stored in the performance preparation message, the lighting device 50 acquires the library data including the corresponding concert identifier from the mobile terminal 60 (S1611).

That is, according to the embodiment of FIG. 8, the lighting device 50 may receive the library data from the mobile terminal 60.

Next, an operation of the lighting device 50 depending on whether the lighting device 50 and a cradle capable of mounting the lighting device 50 are docked with each other will be described.

Figure 17A:
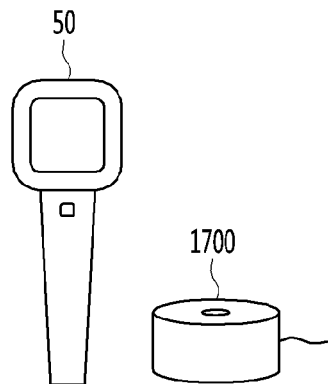
FIGS. 17A and 17B are diagrams explaining an operation of a lighting device in case that the lighting device and a cradle are not docked with each other according to an embodiment of the present disclosure.
Figure 17B:
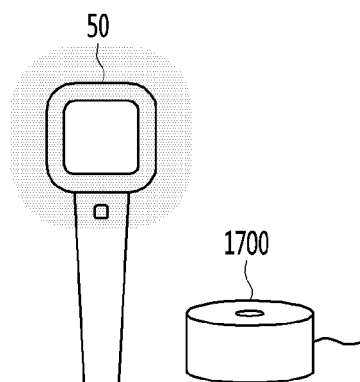

FIGS. 17A and 17B are diagrams explaining an operation of a lighting device in case that the lighting device and a cradle are not docked with each other according to an embodiment of the present disclosure.

A cradle 1700 may be a device capable of supplying power, provided from outside, to the lighting device 50 in case that the lighting device 50 is mounted on the cradle 1700.

Referring to FIG. 17A, the lighting device 50 and the cradle 1700 are separated from each other, and the power of the lighting device 50 is in an off state.

Referring to FIG. 17B, the lighting device 50 and the cradle 1700 are separated from each other, and the power of the lighting device 50 is in an on state. If the lighting device 50 operates in the standalone mode in a power-on state, it can support four cheer modes.

The four cheer modes may correspond to a plurality of buttons 58a to 58d provided on the lighting device 50, respectively.

If any one of the plurality of buttons 58a to 58d is selected, the lighting device 50 may control the operation of the light source unit 56 to operate in the cheer mode corresponding to the selected button.

Next, an operation of the lighting device 50 in case that the lighting device 50 and the cradle 1700 are docked with each other will be described.

Figure 18A:
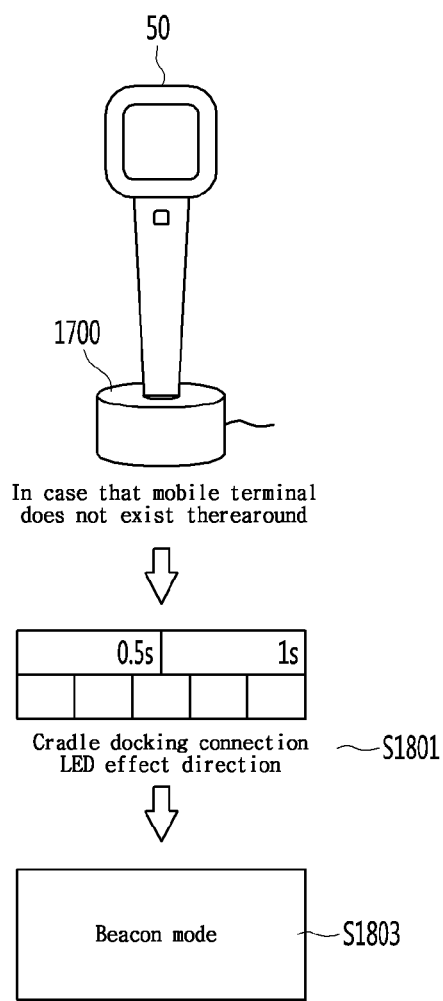
FIGS. 18A and 18B are diagrams explaining an operation process of a lighting device in case that the lighting device and a cradle are docked with each other according to an embodiment of the present disclosure.
Figure 18B:
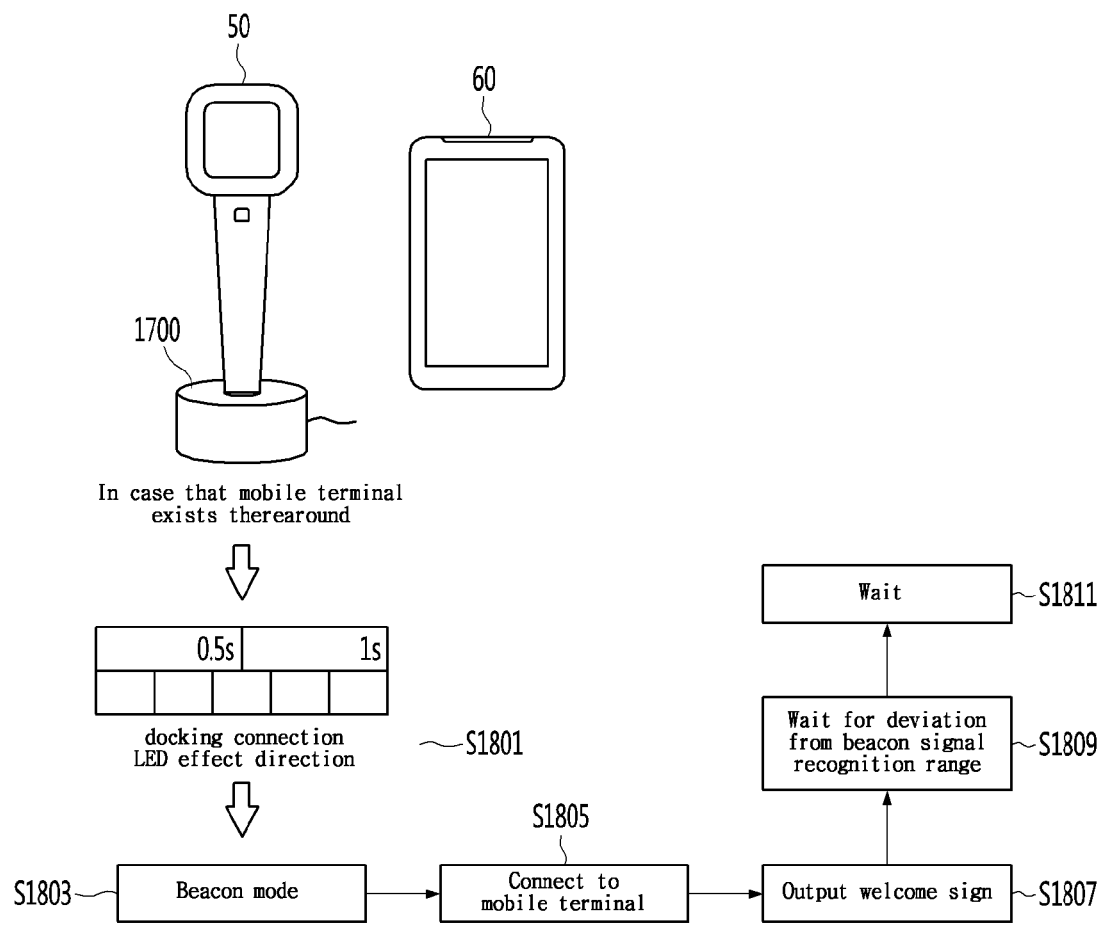

FIGS. 18A and 18B are diagrams explaining an operation process of a lighting device in case that the lighting device and a cradle are docked with each other according to an embodiment of the present disclosure.

In particular, FIG. 18A explains the operation process on the assumption that the lighting device 50 and the cradle 1700 are docked with each other and a mobile terminal does not exist therearound.

In case that the lighting device 50 and the cradle 1700 are docked with each other, the lighting device 50 may output a light pattern indicating that the cradle 1700 is connected thereto (S1801).

Thereafter, the lighting device 50 may activate the BLE mode (specifically, beacon mode), and may transmit a beacon signal to outside in a broadcasting method using an AltBeacon protocol (S1803).

Referring to FIG. 18B, after performing operations S1801 and S1803, the lighting device 50 may be connected to the mobile terminal 60 in response to the beacon signal (S1805).

In case that the lighting device 50 is connected to the mobile terminal 60, the lighting device 50 may output light indicating a welcome sign (S1807).

In case that the mobile terminal 60 is connected to the lighting device 50, the mobile terminal 60 may transmit a command for outputting the light indicating the welcome sign to the lighting device 50.

Thereafter, the lighting device 50 waits for deviation from a beacon signal recognition range (S1809), that is, the lighting device 50 recognizes that the mobile terminal 60 does not exist therearound, and if the mobile terminal 60 does not exist therearound, the lighting device 50 waits for a predetermined time (S1811).

Hereinafter, a process will be described, in which a central server generates data for all directions used by the respective lighting devices for the performance time.

Figure 19:
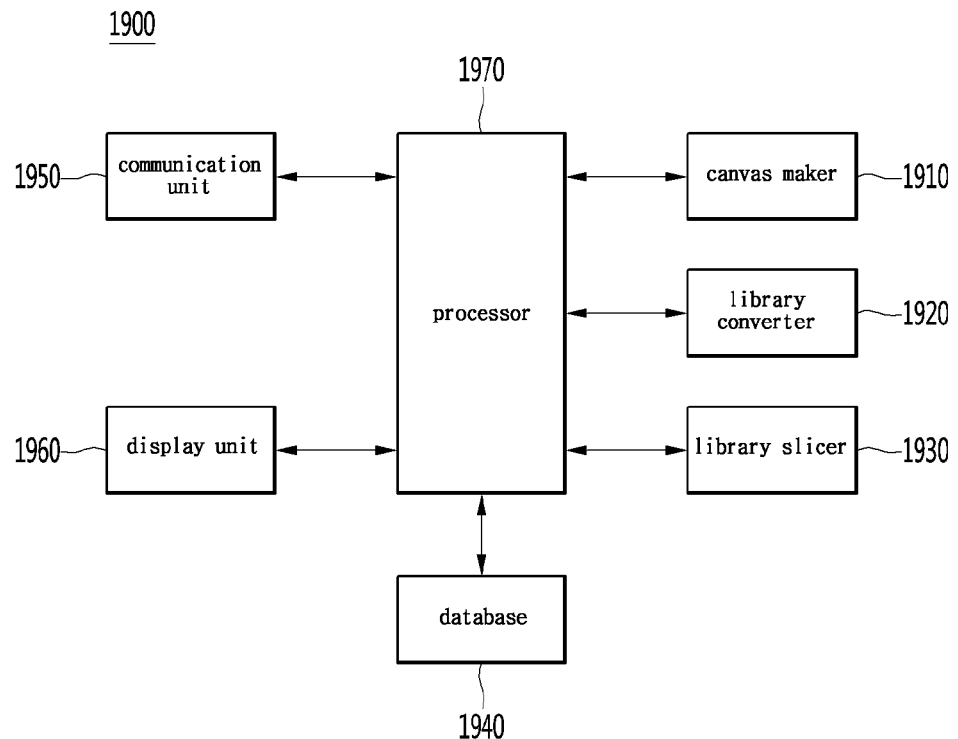
FIG. 19 is a block diagram explaining the configuration of a central server according to another embodiment of the present disclosure.

FIG. 19 is a block diagram explaining the configuration of a central server according to another embodiment of the present disclosure.

A central server 1900 according to another embodiment of the present disclosure may include a canvas maker 1910, a library converter 1920, a library slicer 1930, a database 1940, a communication unit 1950, a display unit 1960, and a processor 1970.

The canvas maker 1910 may generate a seat map of the performance.

The canvas maker 1910 may map a ticket identifier to each of a plurality of seats constituting the seat map. The ticket identifier may be a seat number for identifying a seat.

Each of the plurality of seats may be called one pixel.

In an embodiment, the canvas maker 1910 may acquire an image of the seat map stored in the database 1940, and may generate the seat map using the acquired image.

In another embodiment, the canvas maker 1910 may generate the seat map using an image obtained through an augmented reality device.

This will be described later.

The library converter 1920 may generate a dot animation to be implemented through the lighting devices using a moving image.

The library slicer 1930 may generate direction data including information on light patterns to be output by the respective lighting devices for a performance time based on the generated dot animation.

The direction data may include information on colors or color patterns to be expressed by respective pixels, time required for expressing the colors, and time required for expressing the color patterns.

The direction data may be included in the library data described above.

The library slicer 1930 may give the direction data corresponding to the respective pixels to the respective pixels.

The database 1940 may store the seat map, direction data, library data corresponding to the library, scenario data corresponding to the scenario, and firmware for driving the library.

The communication unit 1950 may transmit the library data or the scenario data to the mobile terminal 60. For this, the communication unit 1950 may be provided with a mobile communication module.

The communication unit 1950 may transmit the library data or the scenario data to the control device 20. For this, the communication unit 1950 may transmit the data to the control device 20 using an unshielded twisted pair (UTP) cable.

The display unit 1960 may display a screen required to generate the direction data, library data, and scenario data.

The processor 1970 may control the overall operation of the central server.

The processor 1970 may generate the library data including the direction data and the scenario data including a plurality of pieces of library data.

Further, although the canvas maker 1910, the library converter 1920, and the library slicer 1930 in FIG. 19 are explained as separate configurations, this is merely an example, and the above-described configurations may be included in the configuration of the processor 1970.

Figure 20:
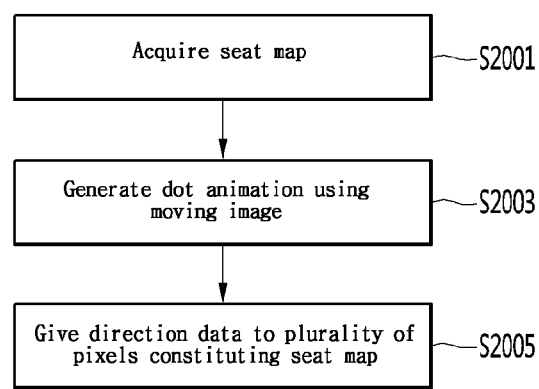
FIG. 20 is a flowchart explaining an operation method of a central server according to another embodiment of the present disclosure.

FIG. 20 is a flowchart explaining an operation method of the central server according to another embodiment of the present disclosure.

Hereinafter, explanation will be made under the assumption that the canvas maker 1910, the library converter 1920, and the library slicer 1930 are included in the configuration of the processor 1970.

Referring to FIG. 20, the processor 1970 acquires the seat map (S2001).

In an embodiment, the processor 1970 may acquire the seat map using a seat map image indicating a performance seat deployment stored in the database 1940.

The seat map may include a plurality of pixel groups. The plurality of pixel groups may correspond to the plurality of lighting groups 50-1 to 50-n, respectively.

Each of the plurality of pixel groups may include a plurality of pixels.

The seat map image may include points for discriminating seats of audiences. The processor 1970 may generate, as one pixel group, some points designated in accordance with an input for designating the some points among all the points.

In another embodiment, the processor 1970 may generate the seat map using an image captured through an augmented reality device. The processor 1970 may receive an input for designating the pixel groups for respective images obtained by capturing images on a performance hall at several angles.

The processor 1970 may acquire the seat map including a plurality of pixel groups in accordance with the designated input.

Figure 21:
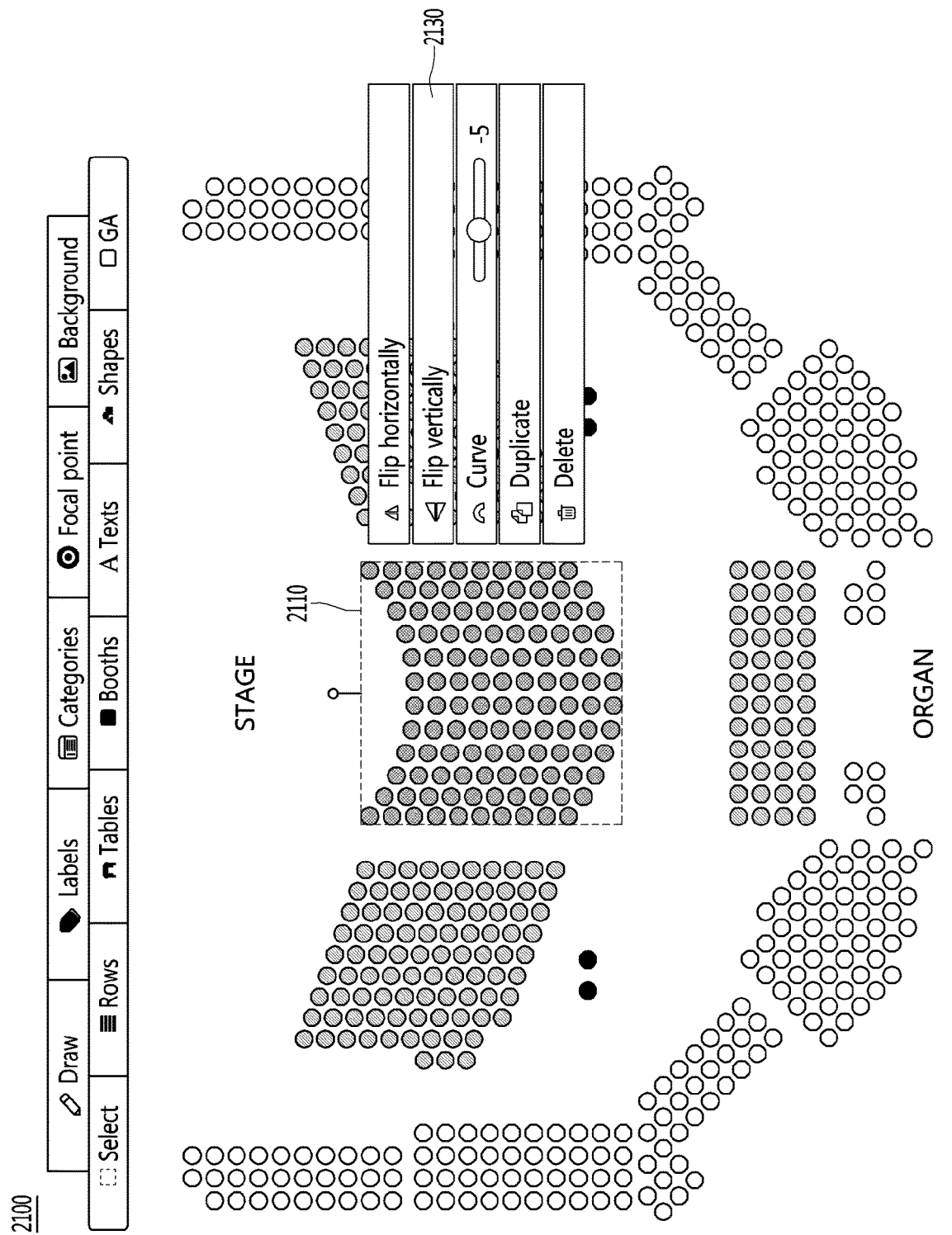
FIG. 21 is a diagram explaining a seat map acquired according to an embodiment of the present disclosure.

FIG. 21 is a diagram explaining a seat map acquired according to an embodiment of the present disclosure.

Referring to FIG. 21, a seat map 2100 is illustrated. The seat map 2100 may include a plurality of pixel groups.

Any one 2110 of the plurality of pixels groups may include a plurality of pixels. The plurality of pixels may correspond to a plurality of seats, respectively. Specifically, the plurality of pixels may correspond to a plurality of lighting devices, respectively.

The display unit 1960 of the central server 1900 may display an edit menu 2130 for editing the seat map 2100. The edit menu 2130 may be a menu for editing the pixel group 2110.

The pixel group 2110 may indicate one lighting group.

The edit menu 2130 may be a menu for editing the pixel group 2110, such as a shape, deployment, copy, and delete of the pixel group 2110.

In case of designing a scenario, a promoter may design the scenario using the seat map.

Meanwhile, according to another embodiment of the present disclosure, the processor 1970 may generate a 3D seat map in consideration of locations and heights of the seats.

A general seat map is in the form of a plane as seen from the sky, but in order for performers and audiences to see a normal light pattern, it is necessary to distort the light pattern.

The processor 1970 may acquire the location of the seat using a GPS module, and may acquire the height of the seat using a barometer.

The processor 1970 may modify the seat map by reflecting the locations and heights of the respective seats acquired from the respective seats in the plane-shaped seat map. Accordingly, the light output pattern output by the lighting devices may be corrected from the viewpoint of the audience or the performer who performs on the stage.

Explanation will be made again with reference to FIG. 20.

The processor 1970 generates the dot animation using a moving image (S2003).

In an embodiment, the dot animation may be an animation indicating the light pattern to be output by the plurality of lighting devices as dots in accordance with the passage of time.

According to another embodiment of the present disclosure, the processor 1970 may generate the dot animation using a combination of sequential images rather than the moving image.

Figure 22:
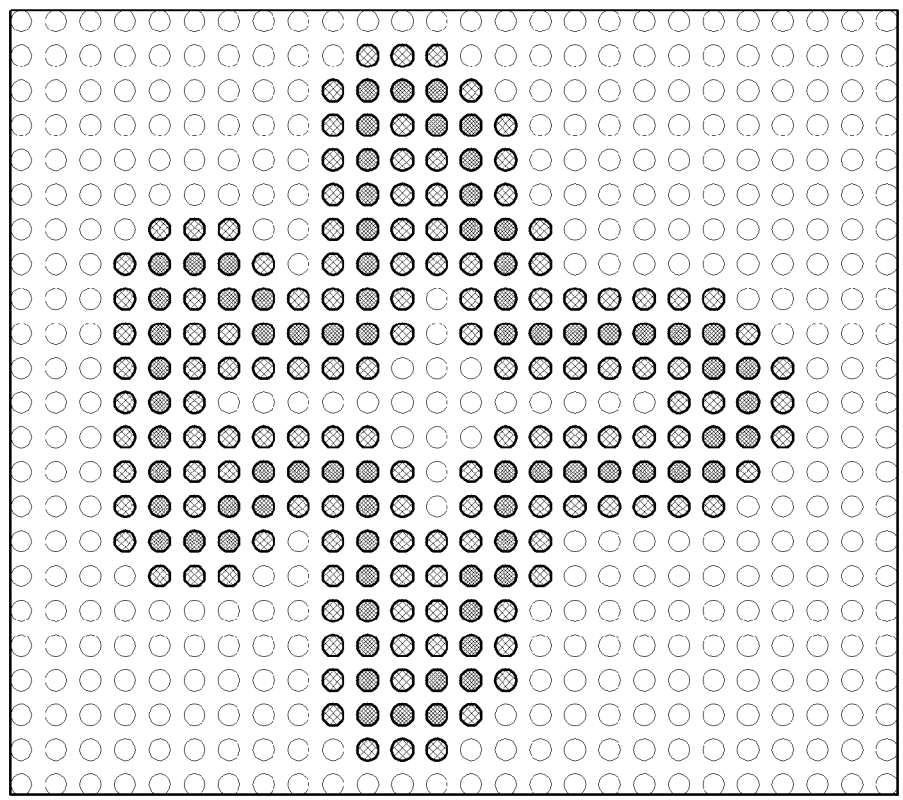
FIGS. 22 and 23 are diagrams explaining a dot animation according to an embodiment of the present disclosure.
Figure 23:
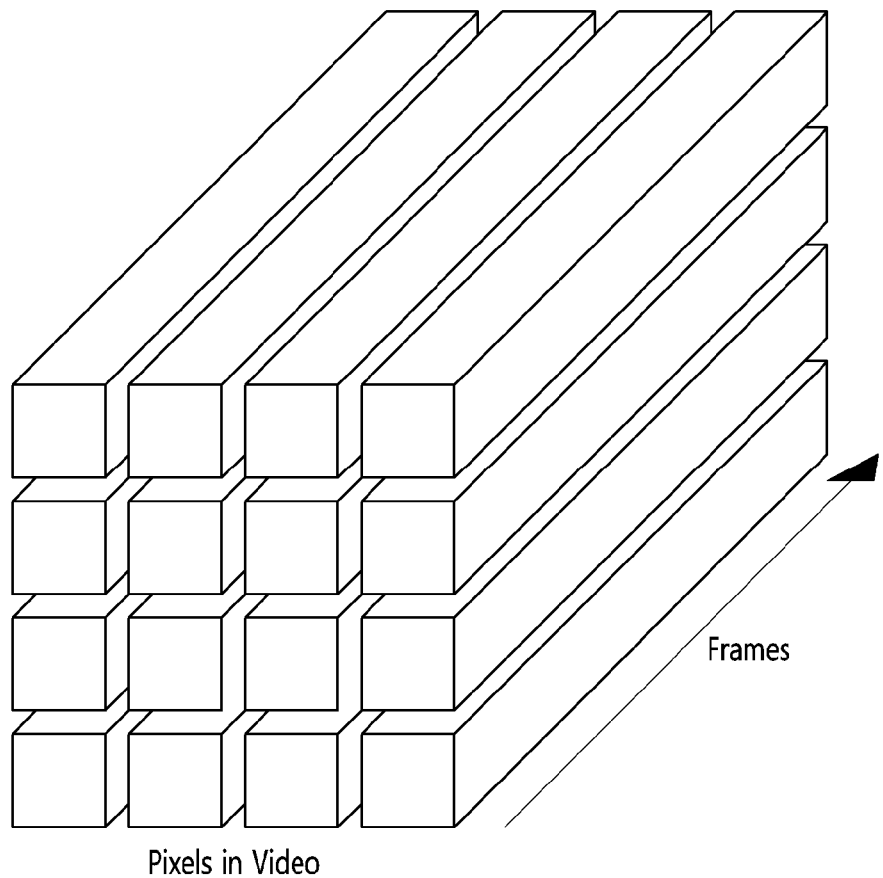

FIGS. 22 and 23 are diagrams explaining a dot animation according to an embodiment of the present disclosure.

The processor 1970 may extract a plurality of pixels from an image frame extracted from a moving image.

The processor 1970 may detect respective colors of the plurality of extracted pixels, and may convert the detected color into any one of 256 colors. The 256 colors have been pre-selected as mainly used colors, and may have an index type having 1 byte.

This is to reduce the size of data by lowering the color resolution because it is difficult to sense fine changes in the colors output by a light source unit of the lighting device with human eyes.

The processor 1970 may generate the dot animation for configuring the library by giving the changed colors to the plurality of pixels.

FIG. 22 shows one scene 2200 of the generated dot animation. That is, each of the plurality of pixels corresponds to one dot to express a specific color. Actually, the specific color is a color of light to be output by the lighting device corresponding to the pixel.

FIG. 23 shows colors to be expressed by the respective pixels in accordance with frames constituting the dot animation in which the respective pixels are generated.

Explanation will be made again with reference to FIG. 20.

The processor 1970 gives direction data to the plurality of pixels constituting the seat map based on the generated dot animation (S2005).

In an embodiment, the direction data may include information on a color to be expressed by a corresponding pixel, a color pattern, and an output period of the color pattern.

From the viewpoint of the light device, the information may be information on colors of light to be output by the light source unit 56 of the lighting device and an output pattern of the light.

The direction data may be included in the library data.

Hereinafter, a process of detecting a color pattern to be output by each pixel will be described in detail.

Figure 24:
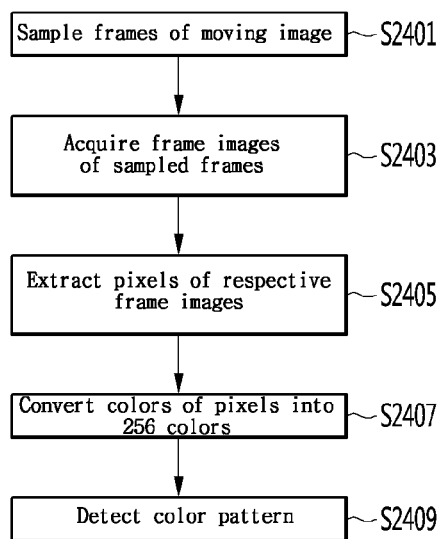
FIG. 24 is a flowchart explaining a process of detecting a color pattern of light to be output by a lighting device according to an embodiment of the present disclosure.

FIG. 24 is a flowchart explaining a process of detecting a color pattern of light to be output by a lighting device according to an embodiment of the present disclosure.

Referring to FIG. 24, the processor 1970 of the central server 1900 samples frames of a moving image (S2401), and acquires frame images for the sampled frames (S2403).

The frame images may constitute the dot animation described above.

The processor 1970 extracts a plurality of pixels from the respective frame images (S2405), and converts the respective colors of the plurality of extracted pixels into 256 colors (S2407).

The processor 1970 detects a color pattern of the pixel based on the 256 converted colors (S2409).

In an embodiment, the color pattern of the pixel may be any one of an on/off pattern, a blink pattern, a breath pattern, and a strobe pattern.

The blink pattern may be a pattern in which two colors are output alternately and repeatedly.

The breath pattern may be a pattern in which a period of color transition is output repeatedly.

The strobe pattern may indicate a pattern in which two colors are output alternately and repeatedly, and an output interval of each color is shorter than that of the blink pattern.

The blink pattern, the breath pattern, and the strobe pattern may be the lower concept of a transit pattern.

Hereinafter, a process of detecting a color pattern in step S2409 will be described in detail.

Figure 25:
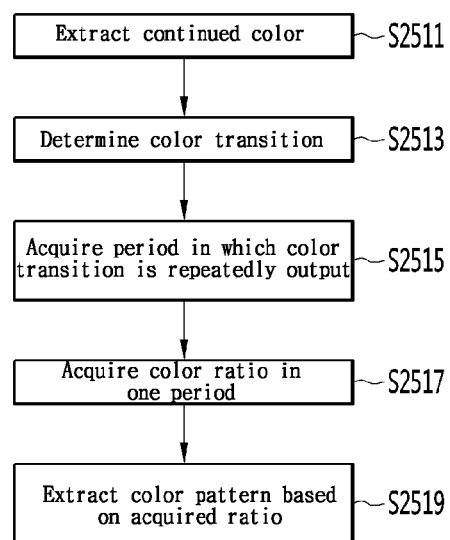
FIG. 25 is a flowchart explaining a process of detecting a color pattern of a pixel according to an embodiment of the present disclosure.

FIG. 25 is a flowchart explaining a process of detecting a color pattern of a pixel according to an embodiment of the present disclosure.

FIG. 25 is a diagram explaining in detail the step S2409 of FIG. 24.

The processor 1970 of the central server 1900 extracts continued colors of a pixel (S2511).

The processor 1970 may determine whether the same color of the pixel is continuously detected in accordance with the passage of time.

This will be described with reference to FIGS. 26 and 27.

Figure 26:
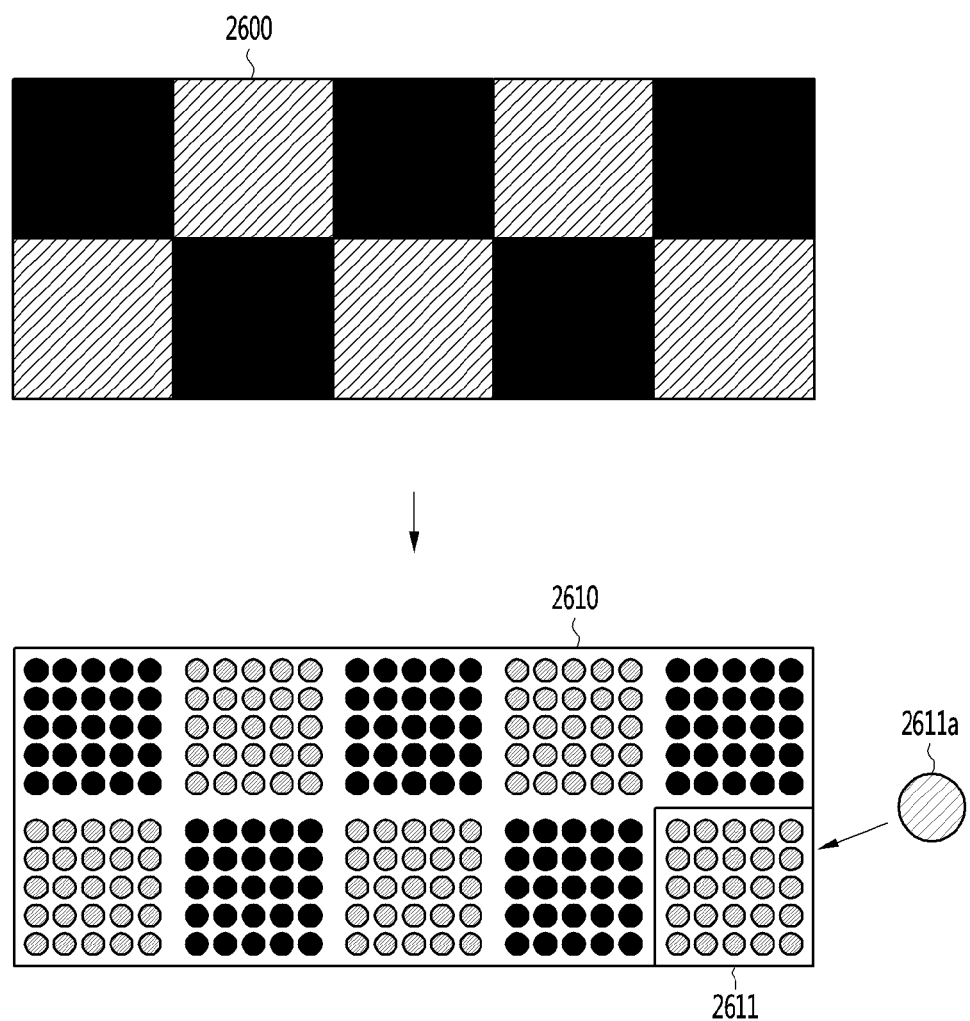

FIGS. 26 and 27 are diagrams explaining a process of extracting a color continuity of a pixel according to an embodiment of the present disclosure.

Referring to FIG. 26, a frame image 2600 extracted from a moving image is illustrated.

The processor 1970 may convert the frame image 2600 into a dot animation 2610.

The converted dot animation 2610 may include a plurality of pixel groups.

The plurality of pixel groups may correspond to the plurality of lighting groups 50-1 to 50-*n* described above, respectively.

The processor 1970 may extract the color of the pixel in accordance with a time line using the dot animation.

Continuity of the color may be determined based on any one pixel 2611*a* included in a pixel group 2611.

FIG. 27 illustrates a first color change diagram 2710 showing an actual change in color of the pixel 2611*a* extracted in accordance with a time line.

The processor 1970 may convert the color of the pixel 2611*a* into any one of 256 colors. The processor 1970 may select among the 256 colors one having the highest similarity to the color.

A second color change diagram 2730 indicates a state where the color of the pixel 2611*a* is converted into any one of the 256 colors.

The processor 1970 may determine how many the same colors are detected for a predetermined time (e.g., for 1 second) through the second color change diagram 2730. Through such a method, the color continuity may be determined.

The step S2511 may be named a first compression process for compressing the color data of the continued color.

Explanation will be made again with reference to FIG. 25.

Thereafter, the processor 1970 determines whether the color transitions after determining the color continuity (S2513).

The step S2513 may be named a second compression process for compressing the data for the transition of the continued color.

Further, in an embodiment, a process of determining the color transition may be performed prior to a process of converting the color, extracted from the pixel, into one of the 256 colors.

In an embodiment, the processor 1970 may determine whether the color transitions using a cosine similarity technique. The cosine similarity technique may be a technique to determine the degree of similarity between two vectors using a cosine value of an angle between the two vectors.

Here, the vector may correspond to the RGB values of the pixel.

A process of determining the color transition using the cosine similarity technique will be described with reference to FIG. 28.

Figure 28:
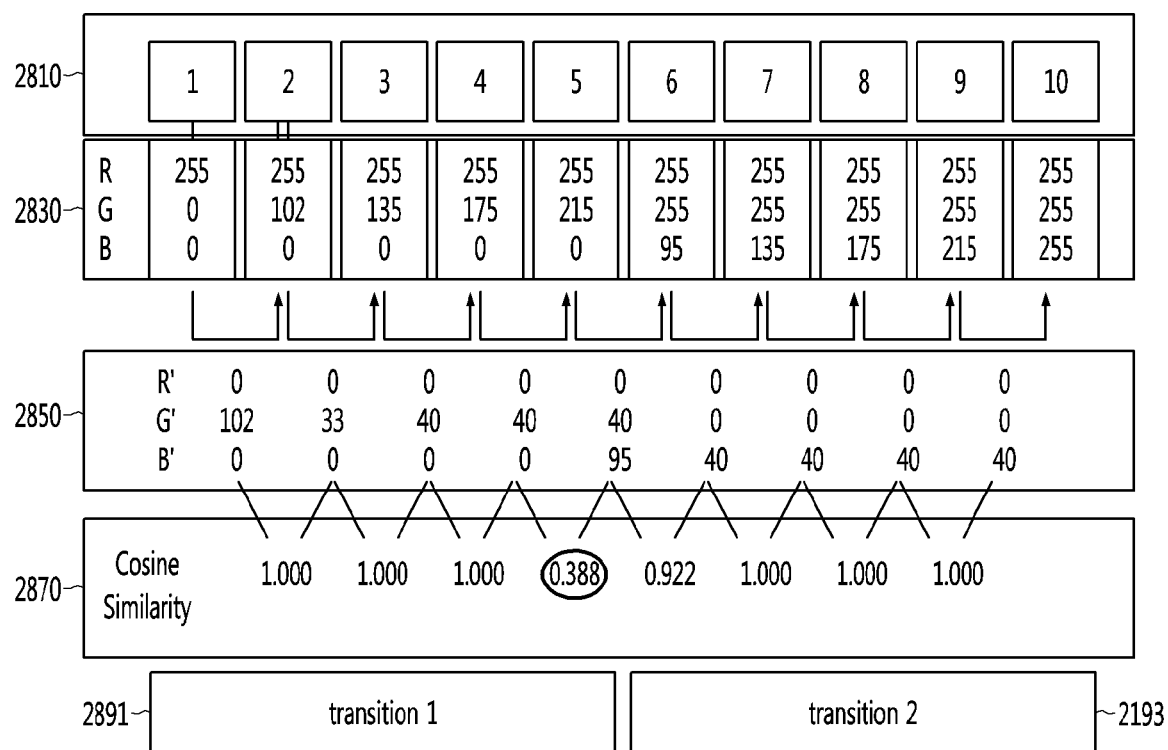
FIG. 28 is a diagram explaining a process of determining a color transition using a cosine similarity technique according to an embodiment of the present disclosure.

FIG. 28 is a diagram explaining a process of determining a color transition using a cosine similarity technique according to an embodiment of the present disclosure.

Referring to FIG. 28, a pixel color group 2810 may indicate a color of a pixel in accordance with the passage of time. That is, the pixel color group 2810 shows the color extracted from one pixel of a frame image in accordance with the passage of time.

The pixel color group 2810 shows the change in color for one pixel in 10 frame images.

A color value group 2830 indicates R, G, and B values corresponding to each of 10 colors.

A color difference value group 2850 may include a first value indicating a difference between an R value of the previous color and an R value of the next color, a second value indicating a difference between a G value of the previous color and a G value of the next color, and a third value indicating a difference between a B value of the previous color and a B value of the next color.

The first, second, and third values may constitute one vector.

A cosine similarity group 2870 is a group including cosine similarities calculated using a cosine value of an angle formed between the previous vector and the next vector.

The cosine similarity may be calculated by a cosine similarity calculation equation 2895.

The processor 1970 may determine whether the color transition has been performed using the change in cosine similarity.

If the cosine similarity value is smaller than a reference value, the processor 1970 determines that the color transition has been performed. Here, the reference value is a standard value for determining the color transition, which may be 0.9, but this is merely an example.

In case that the value of the cosine similarity calculated for the fourth time is 0.388, the processor 1970 may determine that the color transition has been performed at the corresponding time.

The processor 1970 may classify 10 colors into a first transit group 2891 and a second transit group 2893.

In order to store information on the changed colors of the pixels in accordance with the passage of time, a large storage space is necessary.

According to an embodiment of the present disclosure, the color transition is determined using 256 colors, and thus the size of the color data can be remarkably reduced.

Explanation will be made again with reference to FIG. 25.

The processor 1970 acquires a period in which the color transition is repeatedly output (S2515).

In an embodiment, the repeated period of the color transition may be used to determine the color pattern later.

The repeated period of the color transition will be described with reference to the second color change diagram 2730 of FIG. 27.

Referring to the second color change diagram 2730, a red is detected for first one second, and a black is detected for next one second. Further, the red is detected for next one second, and the block is detected for next one second.

The processor 1970 may determine that the period in which the color transition is repeatedly output is two seconds (T).

Thereafter, the processor 1970 acquires a color ratio within one acquired period (S2517).

The color ratio may indicate a ratio of a frequency of a specific color against a total frequency of the detected colors in one period.

Referring to FIG. 27, the red may be extracted 10 times and the black may be extracted 10 times, within one period. In this case, the color ratio may be 1:1.

The processor 1970 extracts the color pattern based on the acquired color ratio (S2519).

The operations S2515 to S2519 may be named a third compression process for compressing the data for the color pattern.

The processor 1970 may extract any one of the blink pattern, the strobe pattern, and the breath pattern based on the acquired color ratio.

Specifically, the processor 1970 may extract the color pattern based on the repeated period of the color transition and the color ratio.

For example, if the first continuous color is detected once and the remaining continuous colors are detected 9 times in one repeated period, that is, if the color ratio is 1:9, the processor 1970 may determine that the color pattern is the strobe pattern.

As another example, if 10 colors in one repeated period include 5 first continuous colors and 5 remaining continuous colors, that is, if the color ratio is 1:1, the processor 1970 may determine that the color pattern is the blink pattern.

Next, a process of converting digital color data into analog color data using the extracted color pattern will be described.

Figure 30:
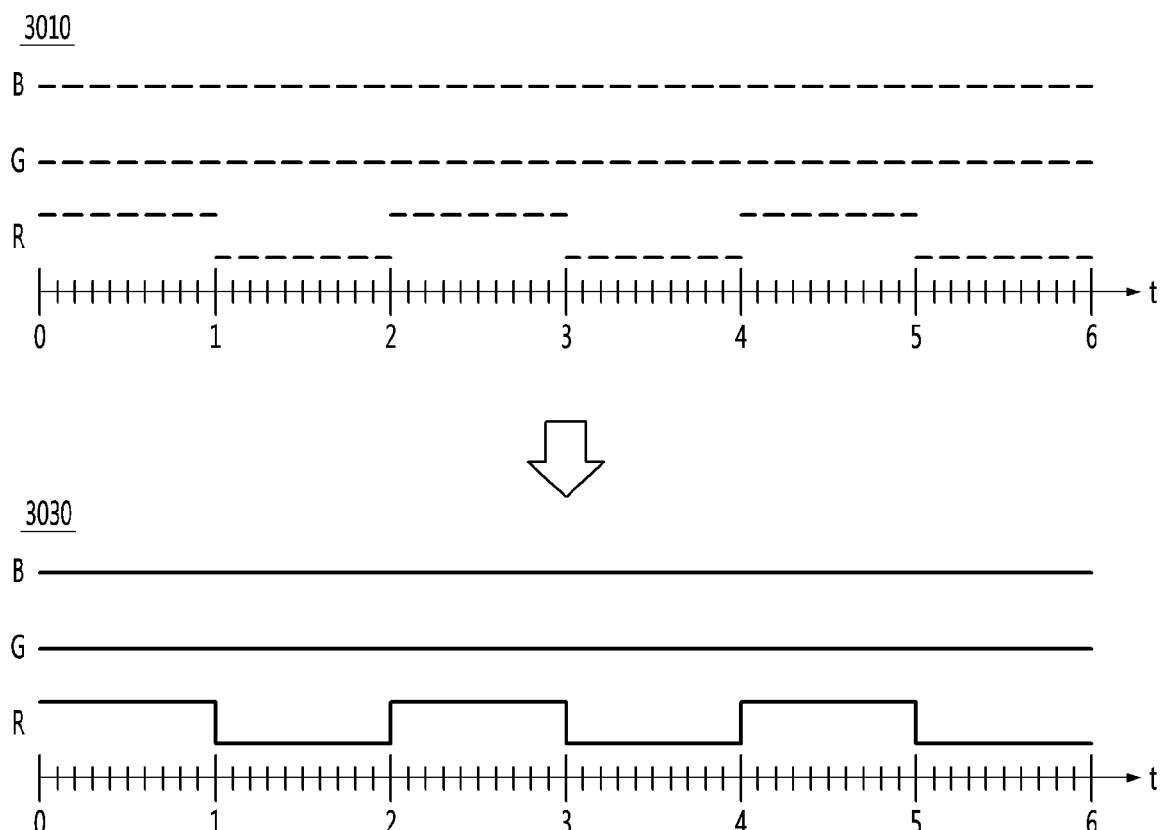
FIG. 30 is a graph illustrating changes in RGB values in case that a color pattern extracted according to an embodiment of the present disclosure is a blink pattern.

FIG. 29 is a graph illustrating changes in RGB values in case that a color pattern extracted according to an embodiment of the present disclosure is the breath pattern, and FIG. 30 is a graph illustrating changes in RGB values in case that a color pattern extracted according to an embodiment of the present disclosure is the blink pattern.

Referring to FIG. 29, a first graph 2910 indicates digital RGB values in accordance with a time line.

The first graph 2910 indicates that the light output pattern is the breath pattern.

The processor 1970 may convert the digital RGB values into the analog RGB values. A second graph 2930 indicates the analog RGB values in accordance with the time line.

Referring to FIG. 30, a third graph 3010 indicates the digital RGB values in accordance with the time line.

The third graph 3010 indicates that the light output pattern is the blink pattern.

The processor 1970 may convert the digital RGB values into the analog RGB values. A fourth graph 3030 indicates the analog RGB values in accordance with the time line.

Meanwhile, the processor 1970 may correct the digital color data of the frame in which an error occurs.

Figure 31:
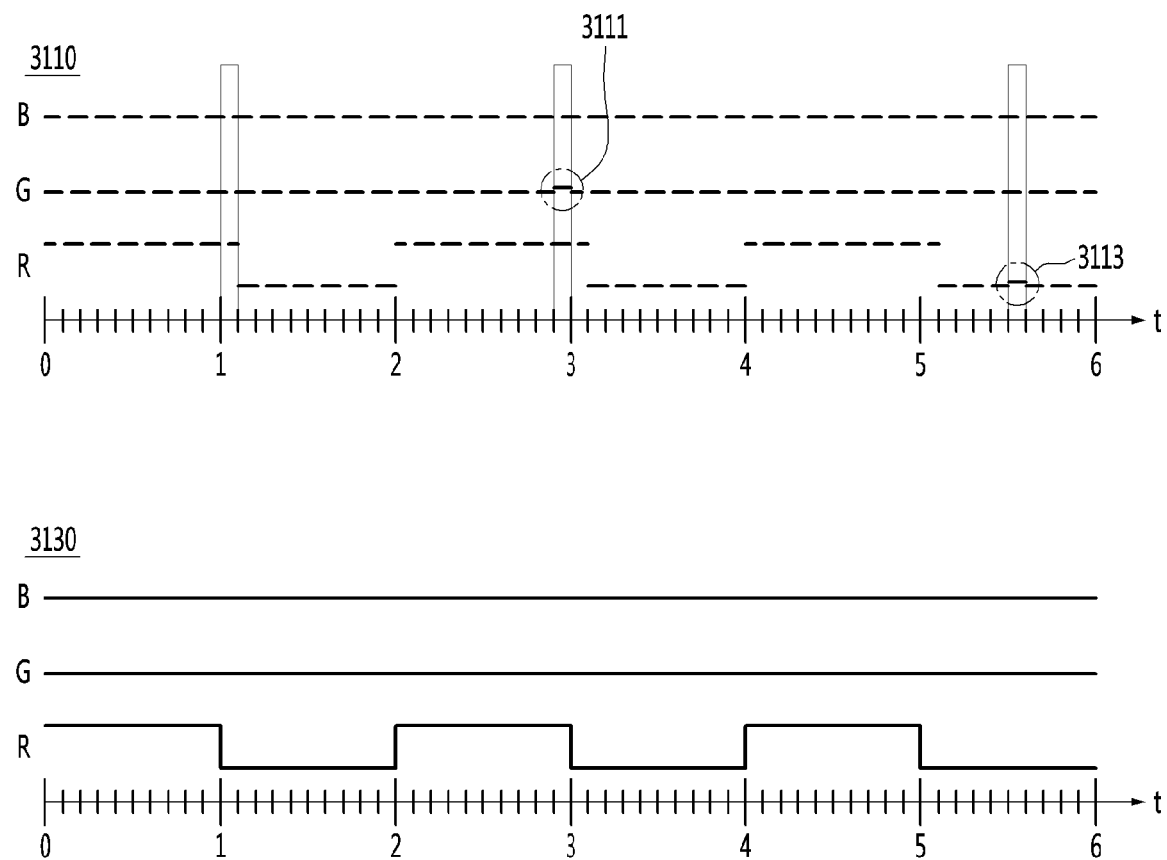
FIG. 31 is a diagram explaining a process of correcting color data of a frame in which an error occurs according to an embodiment of the present disclosure.

FIG. 31 is a diagram explaining a process of correcting color data of a frame in which an error occurs, according to an embodiment of the present disclosure.

FIG. 31 explains the process on the assumption that the extracted color pattern is the blink pattern.

Referring to FIG. 31, a fifth graph 3110 indicates digital RGB values in accordance with a time line. In the fifth graph 3110, a phenomenon that a G value projects from a first portion 3111 occurs, and a phenomenon that an R value projects from a second portion 3113 occurs.

If there occurs a different pattern from an adjacent color value as in the first portion 3111 or the second portion 3113, the processor 1970 may correct the corresponding portions.

That is, if the corresponding color value is unable to follow a determined color pattern, the processor 1970 may correct the corresponding color value so that the corresponding color value follows the determined color pattern. Such work may be named an upgrade work.

In accordance with the correction result, a sixth graph 3130 indicating the analog RGB values may be obtained.

Figure 32:
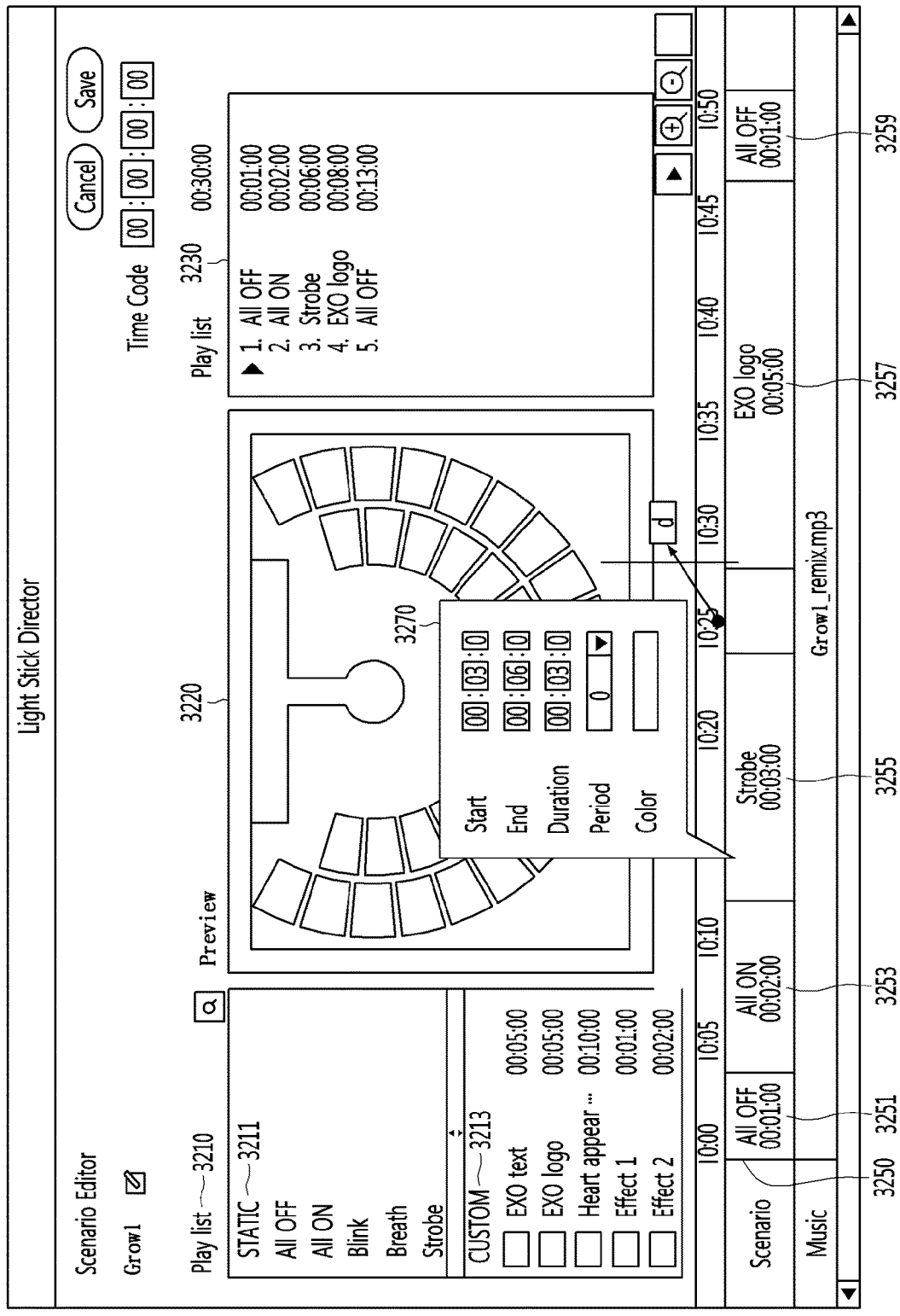
FIG. 32 is a diagram explaining a scenario edition screen for a control device to edit a scenario or a library according to an embodiment of the present disclosure.

FIG. 32 is a diagram explaining a scenario edition screen for a control device to edit a scenario or a library according to an embodiment of the present disclosure.

FIG. 32 explains the scenario edition screen on the assumption that a scenario edition screen 3200 of FIG. 32 is a screen that is displayed by the control device 20, but the scenario edition screen is not necessarily limited thereto, and the scenario edition screen may be a screen that can be displayed by the central server 1900.

The scenario edition screen 3200 may include a library list 3210, a seat map 3220, a play list 3230, and a scenario 3250 including a plurality of libraries 3251, 3253, 3255, 3257 and 3259.

The library list 3210 may include a plurality of libraries for configuring the scenario.

The library list 3210 may include a static item 3211 and a custom item 3213.

The static item 3211 may include libraries configured as default.

The custom item 3213 may include libraries designed in accordance with the intention of a promoter. For example, the custom item 3213 may include a library for implementing a singer's name as a text or a logo indicating a singer.

The seat map 3220 is a seat map acquired as described above with reference to FIG. 20.

The play list 3230 may be a list for playing one or more libraries selected from the library list 3210.

On the play list 3230, one or more libraries to be performed by the lighting devices in an actual performance may be displayed.

The promoter may simulate a process of performing a library in accordance with a command for playing any one library in the play list 3230.

Further, in an embodiment, if any one library is selected from the play list 3230, the control device 20 may generate a control message for executing the selected library. The generated control message may be transmitted to the lighting devices as described above.

The scenario 3250 may correspond to a playback interval of one song. The scenario 3250 may include a plurality of libraries 3251, 3253, 3255, 3257 and 3259.

If a plurality of libraries are selected in accordance with a user's input, the control device 20 may generate one scenario 3250 by combining the selected libraries.

Each of the plurality of libraries 3251, 3253, 3255, 3257 and 3259 may be a library included in the play list 3230.

A first library 3251 may indicate that the light source units 56 of all the lighting devices should be turned off for one minute from a start of a song.

A second library 3253 may indicate that the light source units 56 of all the lighting devices should be turned on for two minutes after performing the first library 3251.

A third library 3255 may indicate that the light source units 56 of all the lighting devices should perform the strobe operation for three minutes after performing the second library 3253.

A fourth library 3257 may indicate that the light source units 56 of all the lighting devices should output light to express a logo of a singer for five minutes after performing the third library 3255.

A fifth library 3259 may indicate that the light source units 56 of all the lighting devices should be turned off for one minute after performing the fourth library 3257.

As described above, one scenario 3250 may be completed through combination of the first to fifth libraries 3251, 3253, 3255, 3257 and 3259.

Meanwhile, if the third library 3255 is selected, the control device 20 may display a popup window 3270 indicating detailed information on the third library 3255.

The popup window 3270 may include one or more pieces of information on a start time, an end time, a holding time, a period of a light output pattern, a color of an output light, and an output color pattern with respect to the third library 3255.

The promoter may edit all matters of a scenario through the scenario edition screen 3200.

Although it has been described that all constituent elements constituting an embodiment of the present disclosure are combined into one or combined to operate, the present disclosure is not necessarily limited to such an embodiment, but one or more of all constituent elements may be selectively combined and operate within the purpose range of the present disclosure.

Further, although each of all constituent elements may be implemented as one independent hardware, parts or all of the constituent elements may be selectively combined to be implemented as a computer program having a program module performing partial or all functions of one or plural hardware combinations. Codes and code segments constituting the computer program may be easily inferred by those skilled in the art to which the present disclosure pertains.

Such a computer program may be stored in a computer readable media and may be read and executed by a computer to implement an embodiment of the present disclosure. The computer program storage media include storage media including magnetic recording media, optical recording media, and semiconductor recording devices. Further, the computer program implementing an embodiment of the present disclosure includes a program module that is transmitted in real time through an external device.

Although the present disclosure has been described with reference to embodiments of the present disclosure, various modifications and changes may be applied thereto at the level of a technician with ordinary skill. Accordingly, it will be understood that such modifications and changes are included within the scope of the present disclosure unless they depart from the spirit and scope of the present disclosure.

The invention claimed is:

1. A central server comprising:
   a database configured to store library data corresponding to a library to be executed by a lighting device;
   a communication unit configured to transmit the library data to a user's mobile terminal; and
   a processor configured to acquire a seat map of a performance hall and to give each of a plurality of pixels, constituting the seat map, direction data including information on a color pattern to be expressed by each of the plurality of pixels,
   wherein the processor is configured to generate a dot animation that is a combination of frame images extracted from an image and to extract colors of the pixels from the generated dot animation,
   wherein the processor is configured to convert the extracted colors into colors most similar to the extracted colors among 256 colors,
   wherein the processor is configured to determine continuity of the converted colors and to determine whether transition of the continued colors is performed after determining the continuity of the colors,
   wherein the processor is configured to determine whether transition of RGB values of the previous color and RGB values of the next color is performed using a cosine similarity technique, and
   wherein the processor is configured to acquire a period in which the transition of the colors is repeatedly output and a color ratio in the period, and the color ratio indicates a ratio of a frequency of a specific color against a total frequency of the detected colors in the period.

2. The central server of claim 1 wherein the processor is configured to extract the color pattern based on the period in which the transition of the colors is repeatedly output and the color ratio.

3. The central server of claim 2, wherein the color pattern is any one of a blink pattern, a strobe pattern, and a breath pattern.

4. The central server of claim 1, wherein the plurality of pixels correspond to a plurality of lighting devices, respectively, each outputting a light pattern corresponding to the color pattern.

5. The central server of claim 1, wherein the library data comprises library identification information for identifying the library, information indicating colors or brightness of light output by a light source unit, and information on a light pattern output by the light source unit.

6. The central server of claim 1 wherein the dot animation is an animation indicating light patterns to be output by a plurality of lighting devices as dots in accordance with the passage of time.

7. The central server of claim 1, wherein the direction data includes information on a color to be expressed by a corresponding pixel, a color pattern and an output period of the color pattern.

\* \* \* \* \*